(12) United States Patent
Lutz

(10) Patent No.: US 7,841,063 B2
(45) Date of Patent: Nov. 30, 2010

(54) DEFORMABLE ELEMENT OF A STEERING WHEEL SPINDLE IN THE FORM OF A CORRUGATED TUBE

(75) Inventor: Christian Lutz, Nüziders (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 122 days.

(21) Appl. No.: 12/222,161

(22) Filed: Aug. 4, 2008

(65) Prior Publication Data
US 2008/0314189 A1    Dec. 25, 2008

Related U.S. Application Data

(63) Continuation of application No. PCT/AT2007/000029, filed on Jan. 24, 2007.

(30) Foreign Application Priority Data
Feb. 7, 2006    (DE) .................. 10 2006 005 736

(51) Int. Cl.
*B21D 39/02*    (2006.01)
*B62D 1/16*    (2006.01)

(52) U.S. Cl. .......................... 29/463; 74/492
(58) Field of Classification Search ............. 29/896.6, 29/890.053, 897.2, 454, 428, 463; 74/492; 72/385, 51, 335, 370.19
See application file for complete search history.

(56) References Cited

U.S. PATENT DOCUMENTS

| | | | |
|---|---|---|---|
| 999,390 | A | 8/1911 | McMartin |
| 3,461,531 | A | 8/1969 | De Gain |
| 3,577,621 | A | 5/1971 | De Gain |
| 5,239,888 | A * | 8/1993 | Sevault et al. ............ 74/492 |
| 5,243,842 | A | 9/1993 | Kobayashi et al. |
| 5,983,695 | A | 11/1999 | Lutz |

FOREIGN PATENT DOCUMENTS

DE    1 652 593    2/1971

(Continued)

OTHER PUBLICATIONS

International Search Report issued in the International (PCT) Application of which the present application is the U.S. National Stage.

*Primary Examiner*—John C Hong
(74) *Attorney, Agent, or Firm*—Wenderoth, Lind & Ponack, L.L.P.

(57) ABSTRACT

In a method for the production of a corrugated tube from a flat metal sheet, two half shells are formed each extending in a longitudinal direction, and the half shells are provided with corrugations oriented transversely to their longitudinal direction. The two half shells are either disposed in a single sheet metal part longitudinally next to one another or are separate parts. In the case of their formation with two half shells disposed in a common sheet metal part next to one another, the preformed sheet metal part in the region between the two half shells is folded or curved about an axis parallel to the longitudinal directions of the half shells, wherein free longitudinal edges of the half shells are brought into mutual contact and are connected with one another. In the case of the formation of the half shells in the form of separate parts, the two half shells are placed against one another with their longitudinal edges and the longitudinal edges are connected with one another. At least one of the two longitudinal edges, coming into mutual contact, of the subshells is provided with a row of cutouts spaced apart from one another in the longitudinal direction of the subshells. Through the connection of sections of this longitudinal edge, located between the cutouts, together with the other longitudinal edge in the connection region of the two longitudinal edges, a row of openings through the casing of the corrugated tube is formed, which openings are spaced apart in the longitudinal direction of the corrugated tube.

12 Claims, 19 Drawing Sheets

FOREIGN PATENT DOCUMENTS

| | | |
|---|---|---|
| DE | 200 09 034 | 10/2000 |
| DE | 103 56 137 | 7/2005 |
| EP | 0 661 117 | 7/1995 |
| EP | 0 782 891 | 12/2001 |
| EP | 1 344 708 | 9/2003 |
| GB | 961188 | 6/1964 |

* cited by examiner

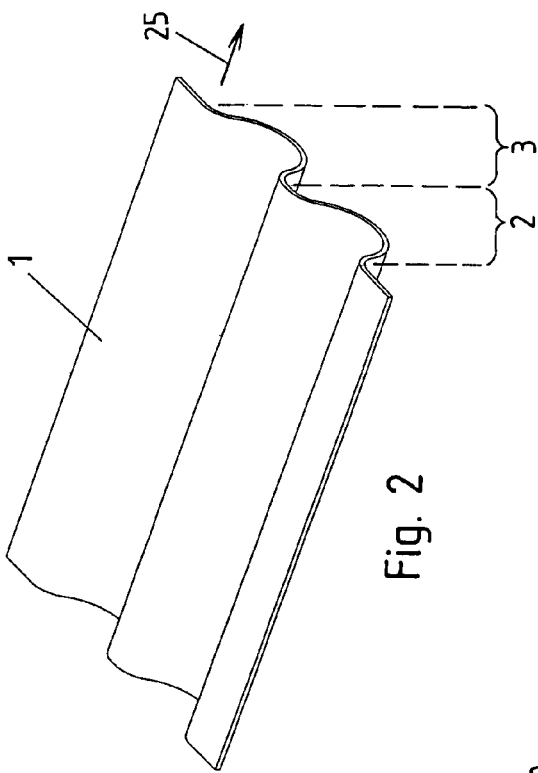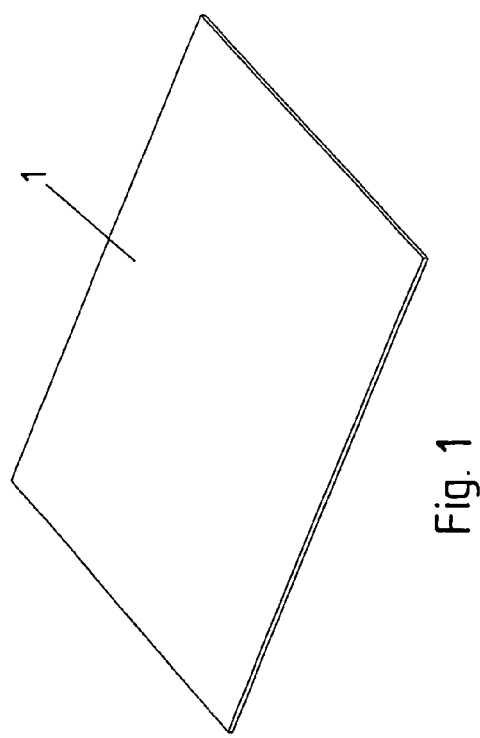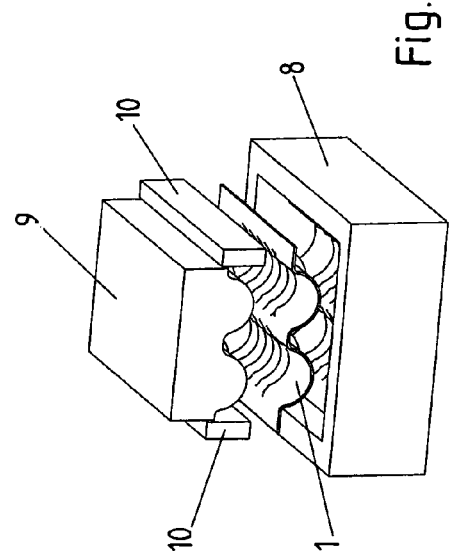

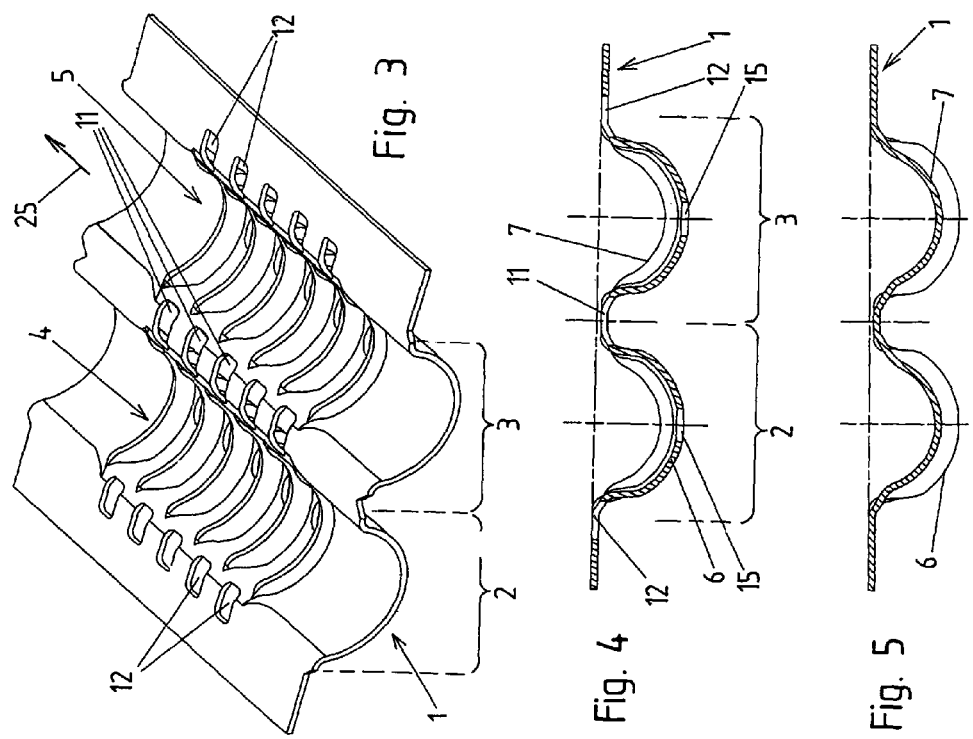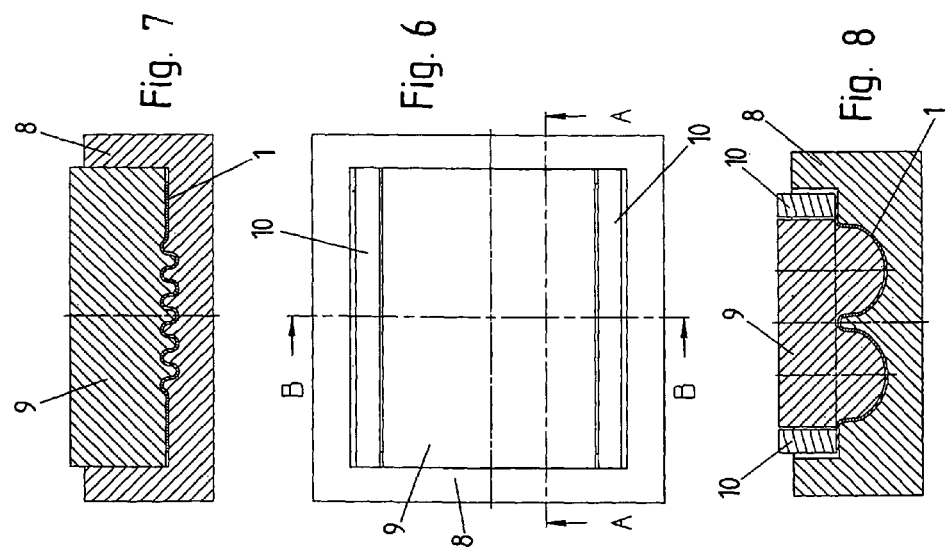

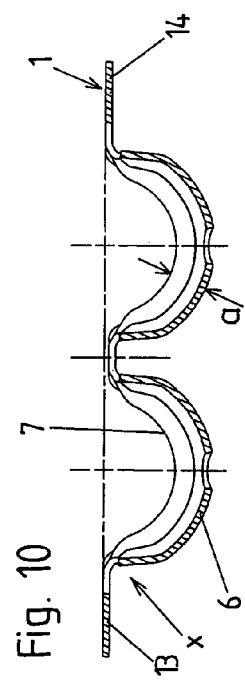
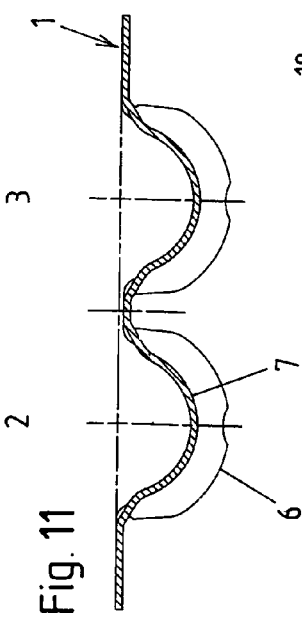
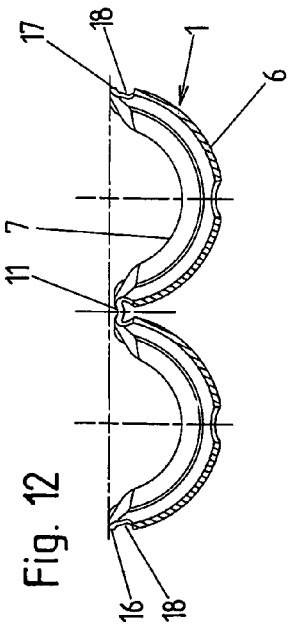
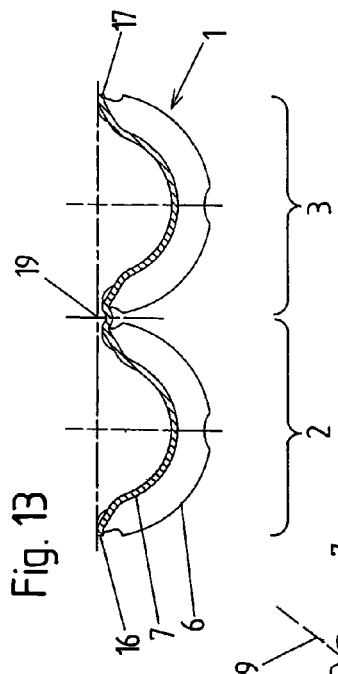
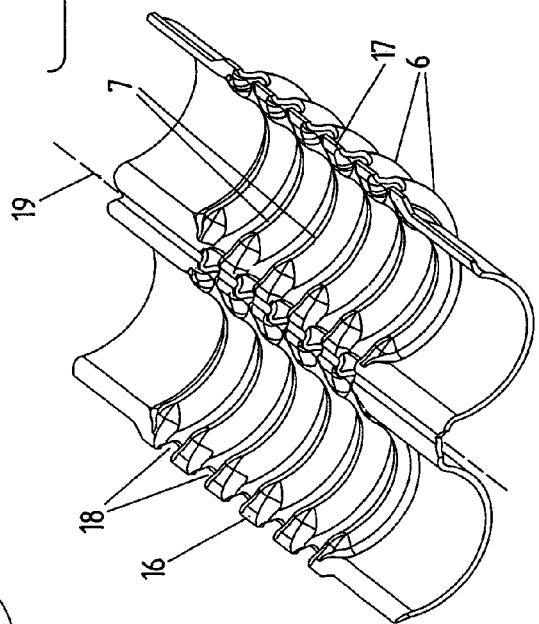

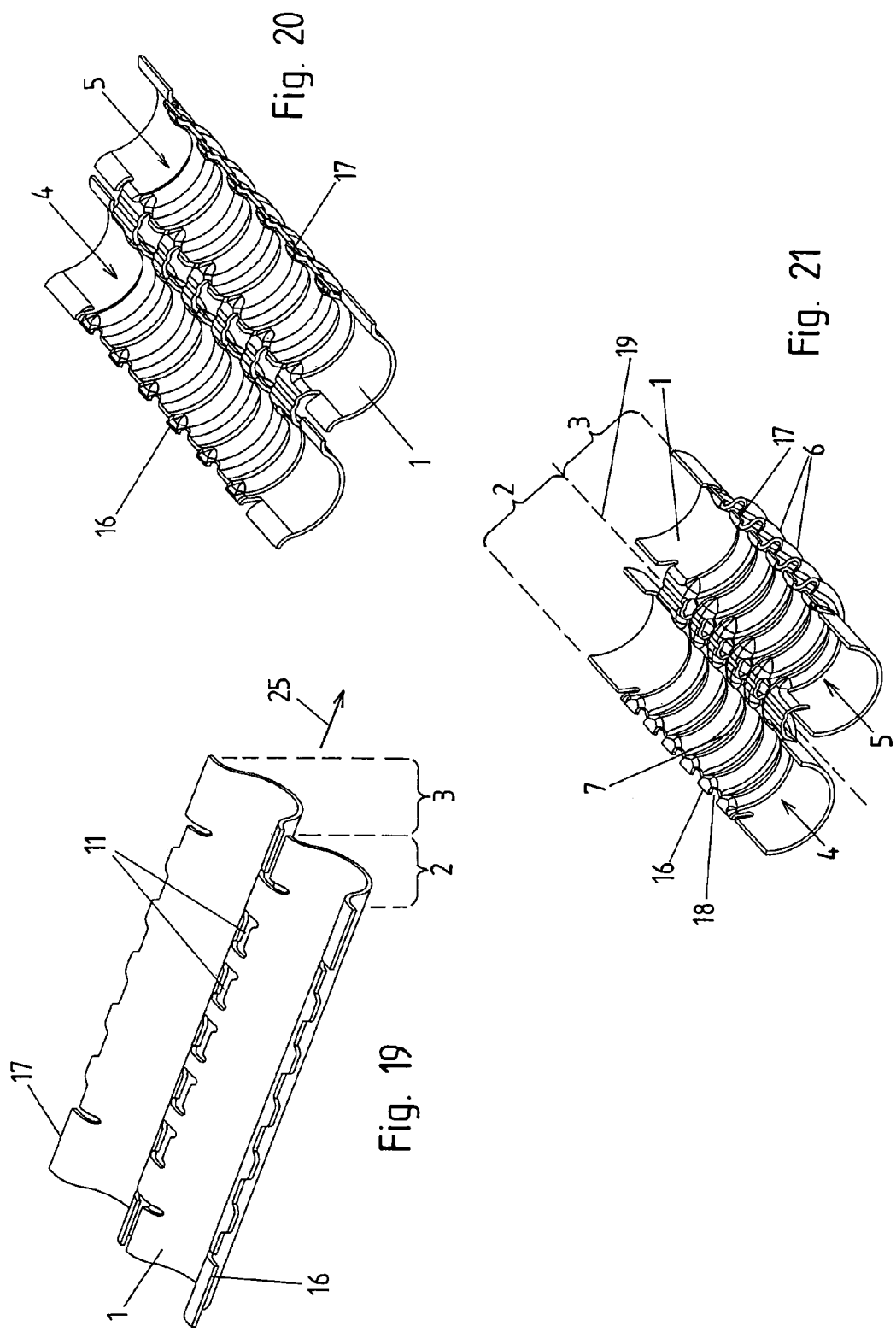

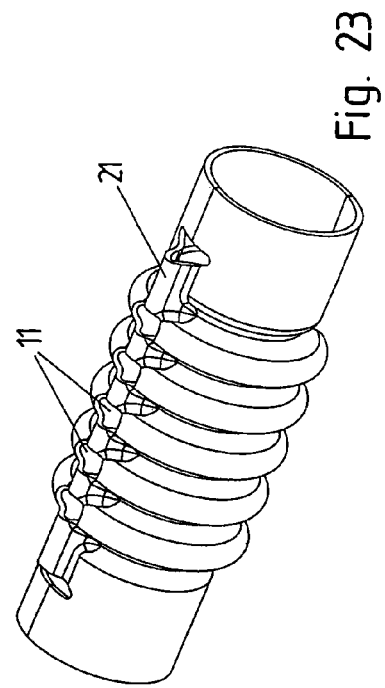
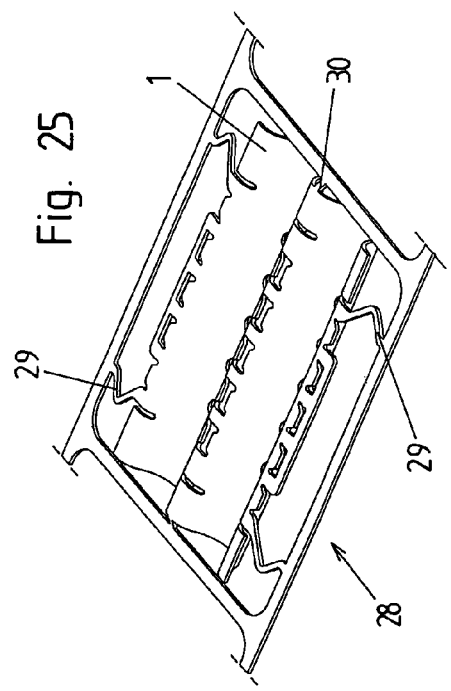
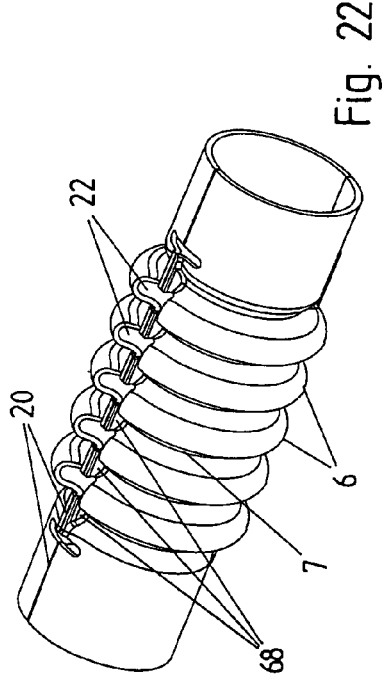
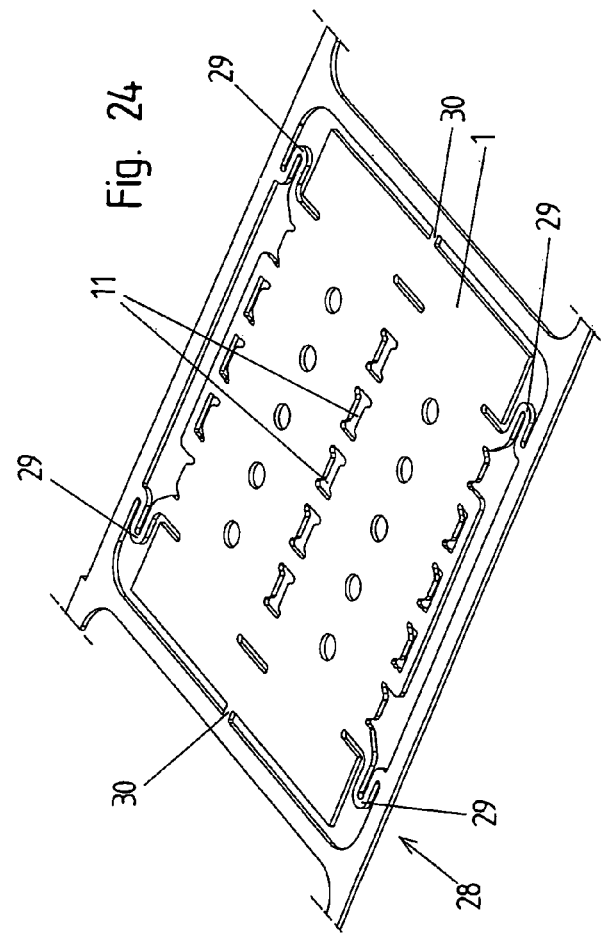

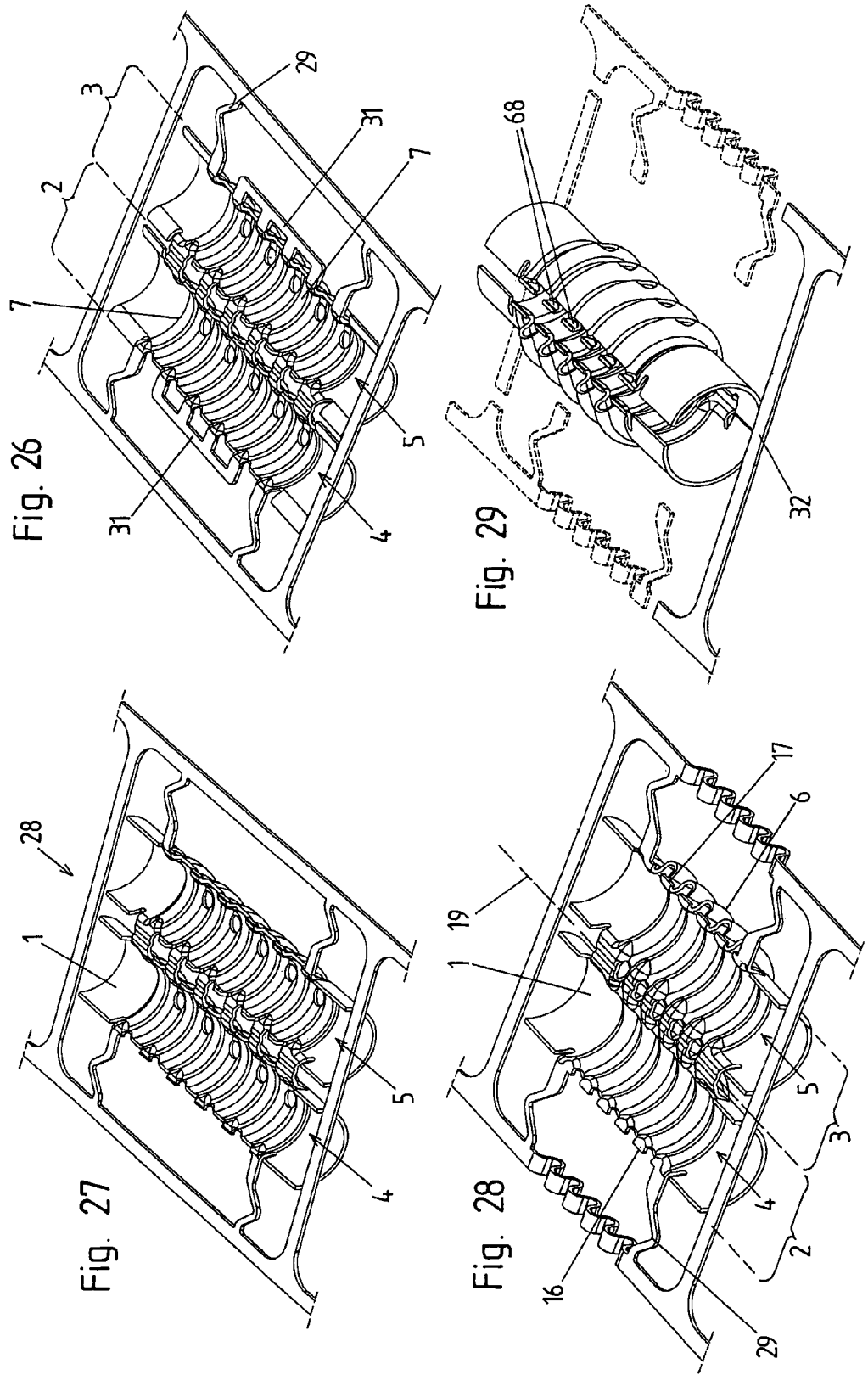

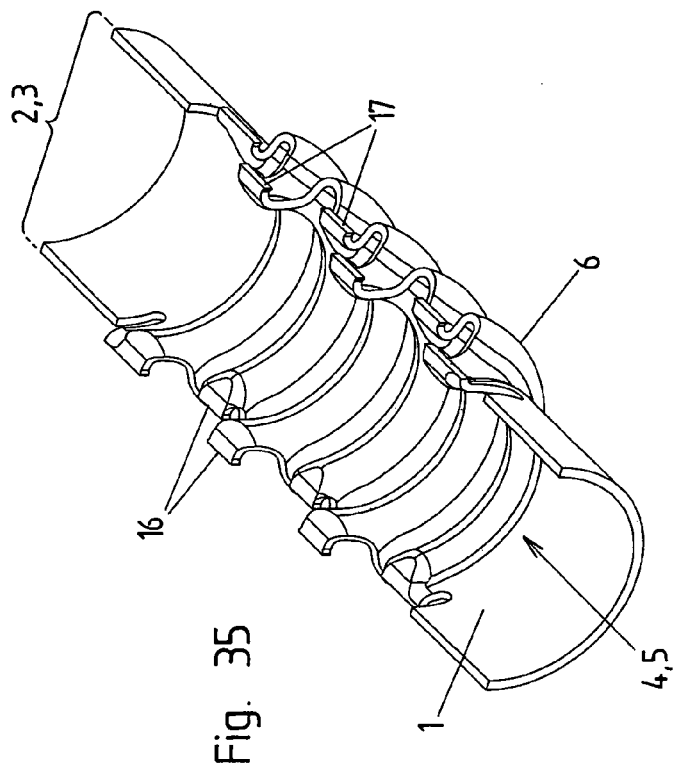
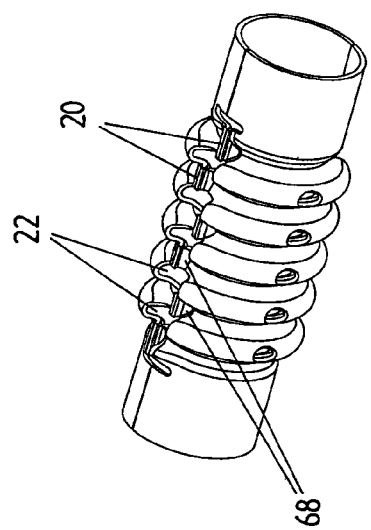
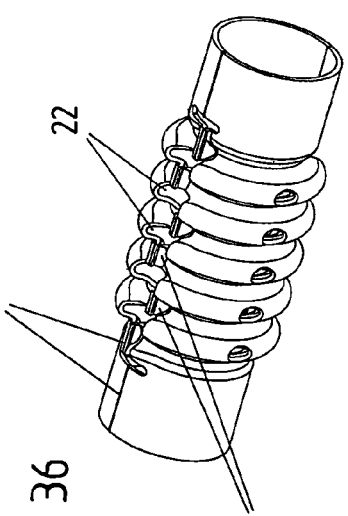

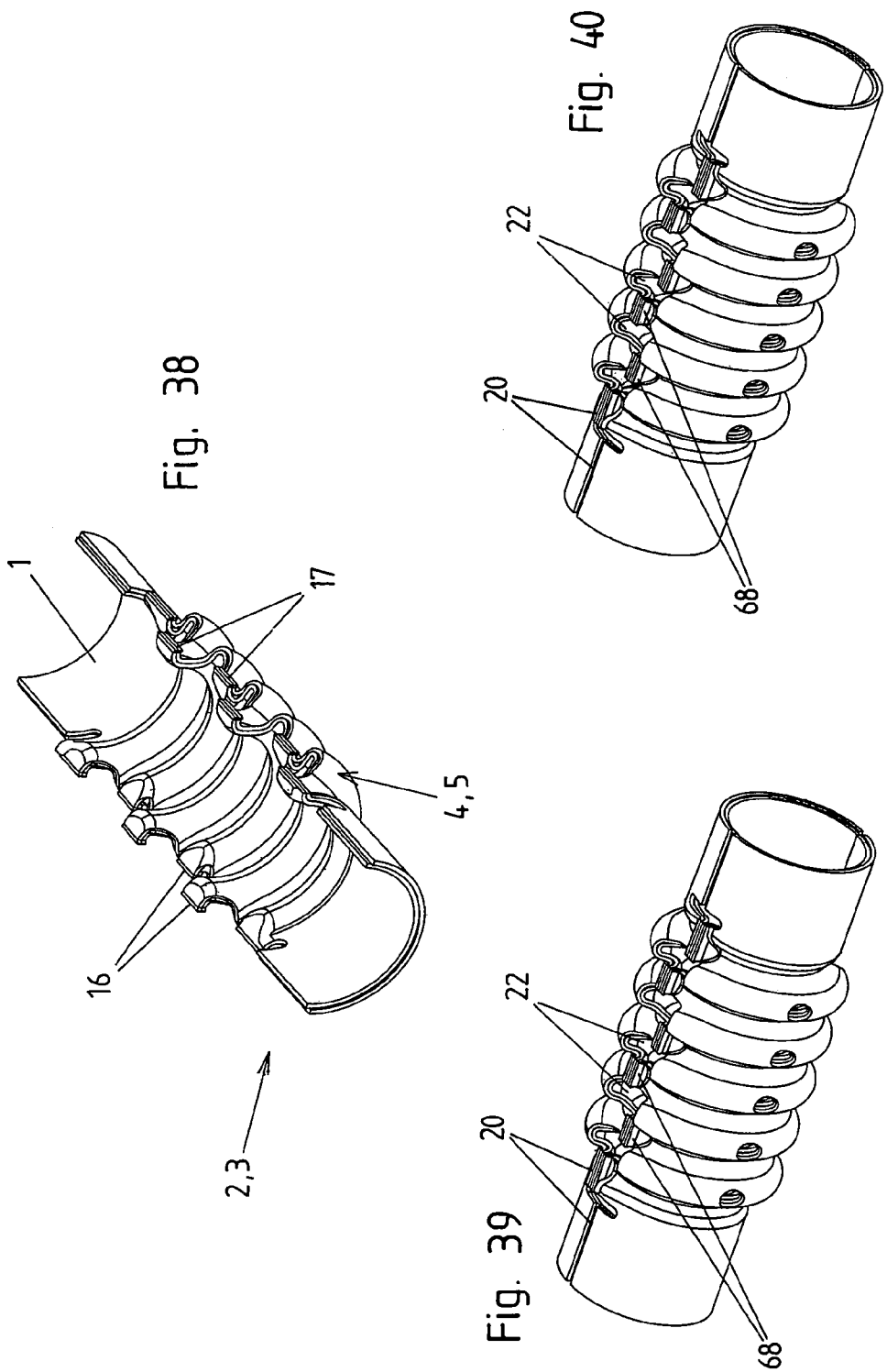

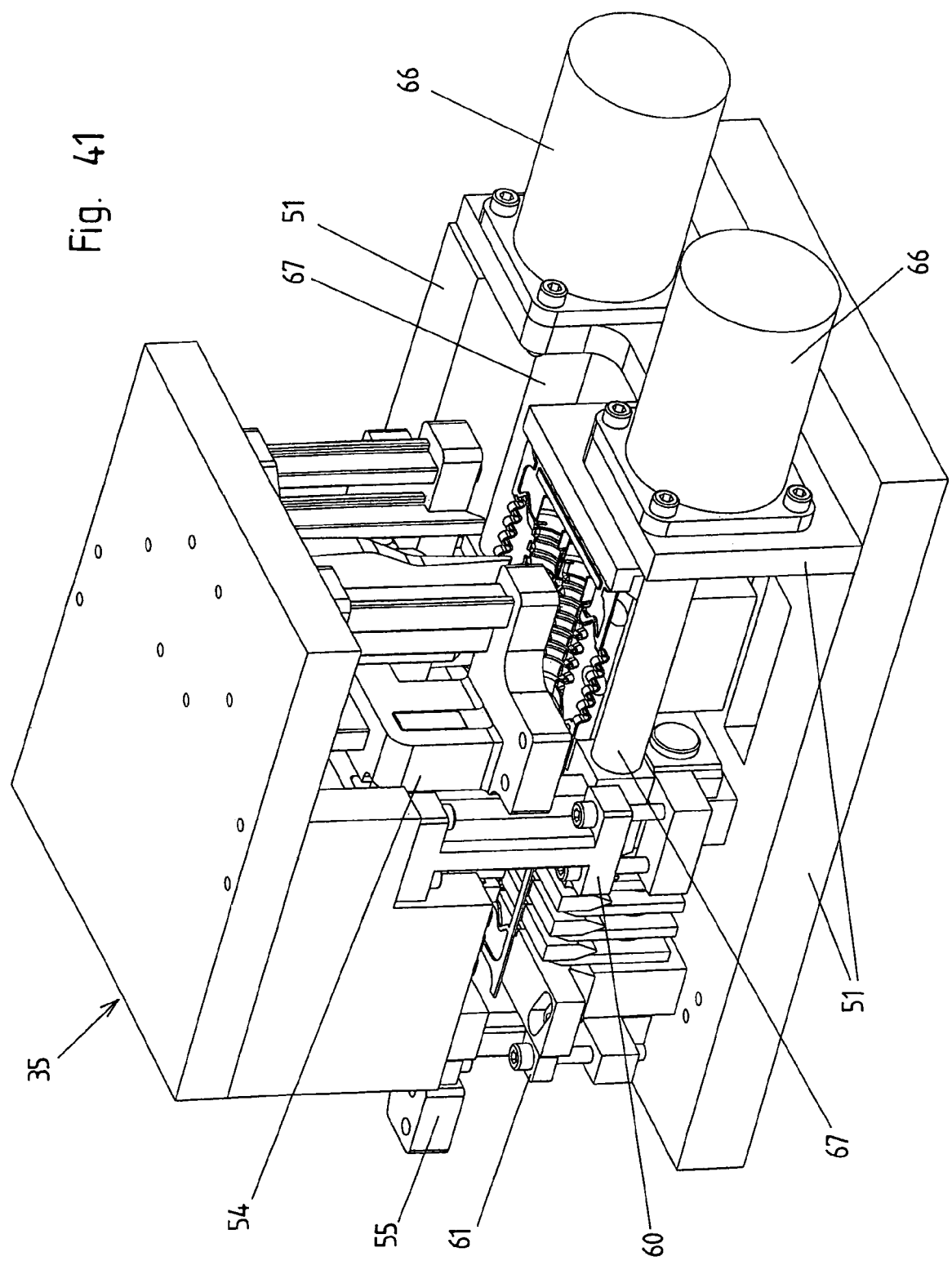

Fig. 50
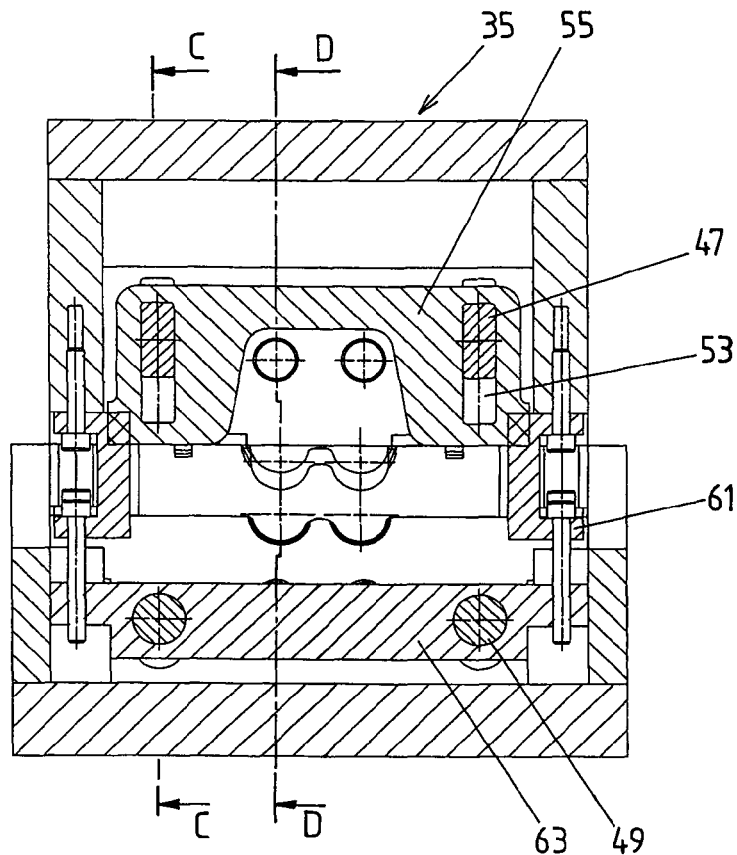
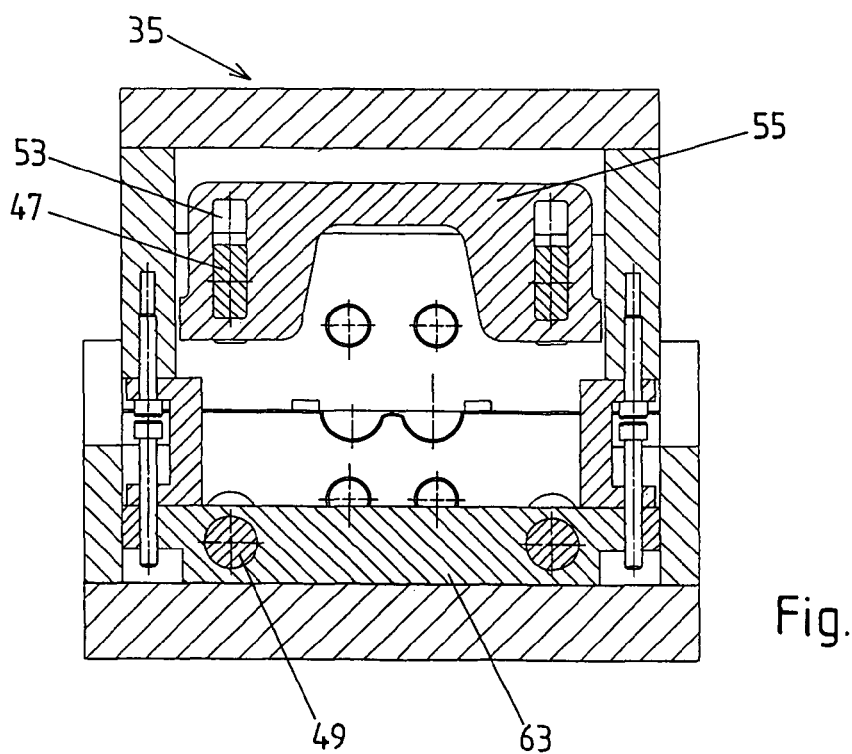
Fig. 51

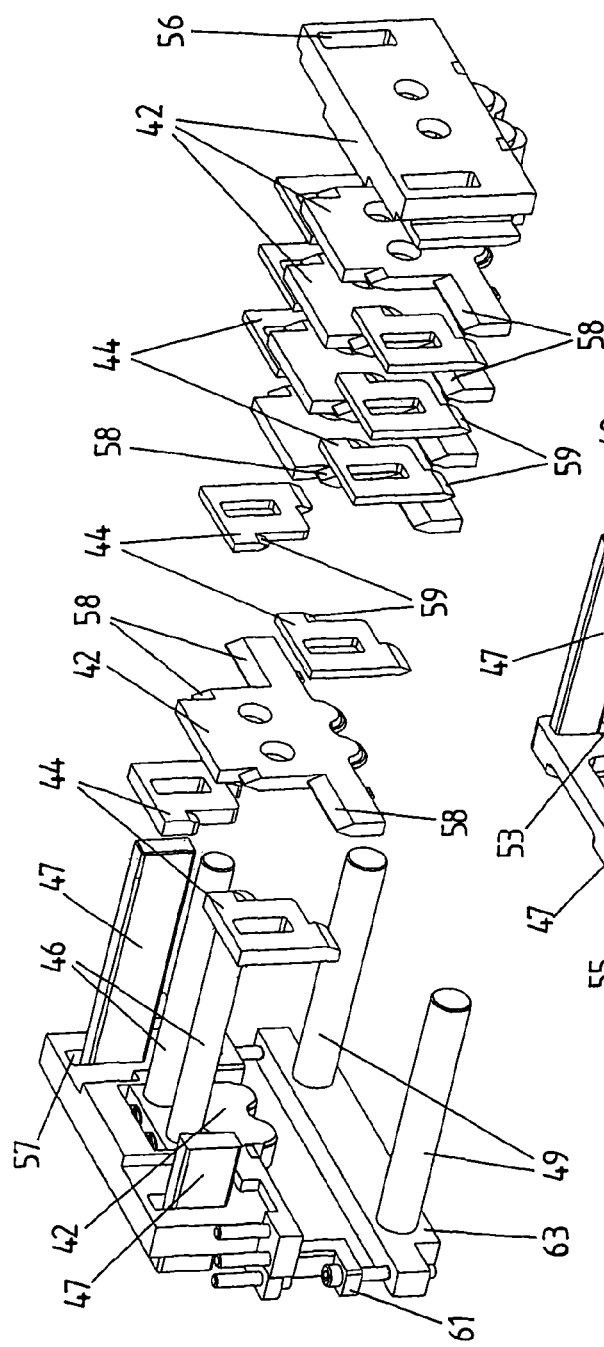
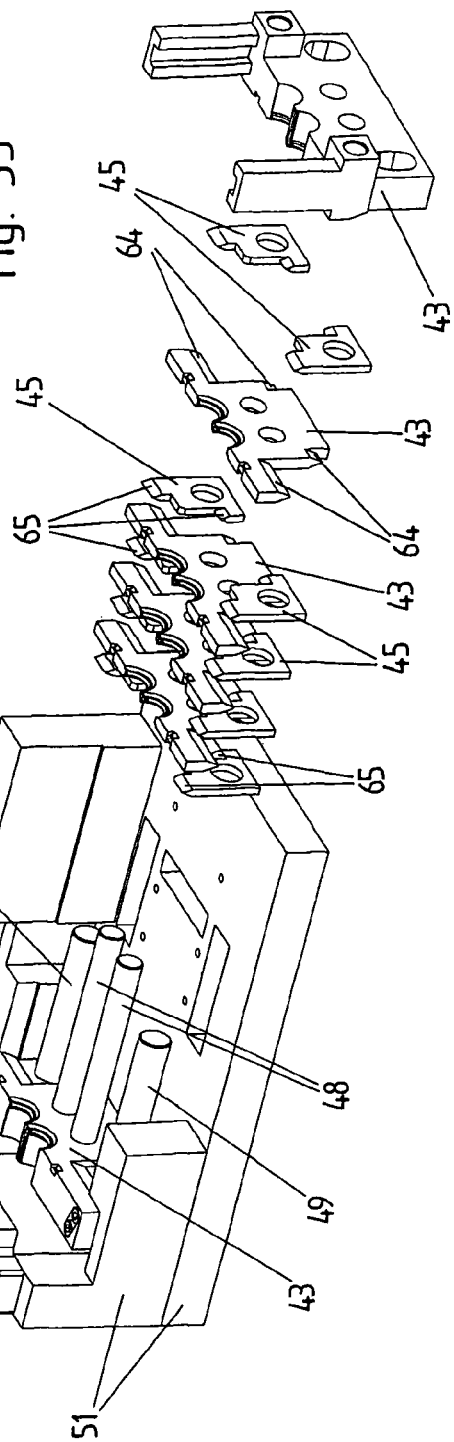
Fig. 52
Fig. 53

DEFORMABLE ELEMENT OF A STEERING WHEEL SPINDLE IN THE FORM OF A CORRUGATED TUBE

This application is a continuation of International application PCT/AT2007/000029 filed Jan. 24, 2007, the complete disclosure of which is incorporated herein by reference.

BACKGROUND OF THE INVENTION a) Field of the Invention

The invention relates to a method for the production of a deformable element, developed in the form of a corrugated tube, of a steering spindle for a motor vehicle, wherein the corrugated tube is provided with openings penetrating the wall of the corrugated tube. The invention further relates to a deformable element, developed in the form of a corrugated tube, of a steering spindle with openings penetrating the wall of the corrugated tube and spaced apart from one another in the longitudinal direction of the corrugated tube.

b) Description of Related Prior Art

Deformable sections of steering spindles developed in the form of corrugated tubes are conventionally produced of tubes which are initially cylindrical. EP 782 891 B1 describes, for example, such a method, wherein initially a precorrugation is stamped into the tube and the tube is subsequently axially compressed by means of press jaws with the unfolding of the precorrugation. A further such method for the production of a corrugated tube is disclosed for example in EP 0 661 117 A1.

A further deformable element of a steering spindle in the form of a corrugated tube for a motor vehicle is disclosed in EP 1 344 708 A2. This multilayered corrugated tube has openings in the region of its wave crest. At an adequate rigidity against a torque acting about the longitudinal axis of the corrugated tube, hereby an improved deformability can be attained in the event of a crash.

Further US 999 390 A discloses a tube which serves for conducting a liquid or gaseous medium, in particular as a culvert. The tube is implemented as a corrugated tube and is comprised of two half-shells connected with one another. Further tubes for conducting a medium are disclosed in DE 200 09 034 U1 and DE 103 56 137 A1.

The various embodiment examples described in DE 200 09 034 U1 are each formed of two or more subshells. The tubular hollow profile disclosed in DE 103 56 137 A1 is comprised of two shells formed from sheet metal, which shells are bent together about a bending line.

DE 1 652 593 A discloses a method for the production of a tubular product in which into a flat metal sheet first a number of parallel extending grooves are stamped, which sequentially in time are progressively formed laterally outwardly from a center groove. In a further method step the sheet metal is perforated. The perforated strip of sheet metal, cut off lengthwise, is transversely bent together in the form of a tube, wherein the two longitudinal edges are connected with one another, in particular by spot welding. In the following, a reaming-out process is carried out on the tubular blank, preferably by an expanding mandrel, whereby corrugations are formed. Through the openings formed in the finished product the compression properties of the finished tube are regulated.

SUMMARY OF THE INVENTION

The problem addressed by the invention is a method of the above stated type through which a deformable element, developed in the form of a corrugated tube, of a steering spindle for a motor vehicle can be fabricated especially cost-effectively, or providing a cost-effectively producible deformable element, developed in the form of a corrugated tube, of a steering spindle for a motor vehicle of the above stated type.

The method of the invention for the production of a deformable element of a steering spindle for a motor vehicle, which is developed in the form of a corrugated tube provided with openings which penetrate through the wall of the corrugated tube, comprises several steps, as explained below.

From a flat metal sheet are formed at least two subshells, each extending in a longitudinal direction, which shells are provided with corrugations oriented transversely to their longitudinal directions. The subshells are disposed in a single sheet metal part longitudinally next to one another or are separate parts. In the case of an implementation with at least two subshells disposed in a common sheet metal part next to one another, the preformed sheet metal part in the region between the two or between two particular subshells are folded or curved about an axis parallel to the longitudinal directions of the subshells and free longitudinal edges of the subshells are brought into mutual contact and are connected with one another. In the case of an implementation of the subshells in the form of separate parts, the separate subshells are placed in contact on one another with their longitudinal edges and the longitudinal edges are connected with one another.

In the step of the connection of the longitudinal edges, at least one of the two longitudinal edges coming into mutual contact of the subshells is provided with a row of cutouts spaced apart from one another in the longitudinal direction of the subshells and through the connection of sections of this longitudinal edge located between the cutouts with the other longitudinal edge in the connection region of the two longitudinal edges a row of openings spaced apart in the longitudinal direction of the corrugated tube through the casing of the corrugated tube is formed.

A deformable element according to the invention of a steering spindle, which is developed in the form of a corrugated tube, comprises openings penetrating the wall of the corrugated tube and spaced apart from one another in the longitudinal direction of the corrugated tube. At least one connection seam extends from one of the longitudinal ends of the corrugated tube to the other. Via this connection seam, two subshell-shaped sections of the corrugated tube are connected with one another and in the axial regions of the corrugated tube, in which are located the wave troughs of the corrugations of the corrugated tube, and in the axial regions of the corrugated tube, in which are located the wave crests of the corrugations, openings are disposed which punctuate the connection seam.

According to the invention as the starting material for the corrugated tube flat sheet metal is utilized. In one embodiment variant of the invention in a common sheet metal part subshells extending in parallel longitudinal directions (=having parallel longitudinal axes), preferably two half shells, are formed which are provided with corrugations oriented transversely to their longitudinal directions, i.e. the wave crests and troughs of the corrugations extend in planes which are transverse, preferably at right angles, to the longitudinal extent of the subshells. Initially, preferably two flute-shaped depressions disposed next to each other are placed into the common flat sheet metal part and in the further course of the method the half shells, formed by the two flute-shaped depressions, are provided with corrugations oriented transversely to their longitudinal directions in one or several steps. In the further course of the method the sheet metal part is folded or curved in the region between the two half shells about an axis parallel to the longitudinal direction of the half shells and the initially free longitudinal edges of the half shells are brought into mutual contact and subsequently connected with one another, preferably welded together. If, for example, instead of two half shells, three one-third shells are formed, two foldings are carried out about axes parallel to the longitudinal direction of the one-third shells, which axes are each located between two one-third shells. The previously free longitudinal edges brought into mutual contact are again connected with one another. In the finished state of the corrugated tube each one-third shell extends over approximately 120° of the circumference.

In a second embodiment variant of the invention separate subshells, preferably two half shells, provided with corrugations oriented transversely to their longitudinal directions are developed either by using sheet metal parts separate from the beginning or by using a single sheet metal part which, in the course of the process, is divided through a die cutting operation such that two or more separate subshells are formed. For the forming of a particular subshell preferably first a flute-shaped depression is formed and subsequently provided with corrugations oriented transversely, preferably at right angles, to their longitudinal direction. In the subsequent course of the method the subshells are placed on one another with their longitudinal edges with the formation of a complete corrugated tube and in the region of their longitudinal edges are connected with one another, preferably welded to one another.

By using flat sheet metal as the starting material, in the manner according to the invention a corrugated tube can be formed highly cost-effectively since sheet metal is less expensive than prefabricated cylindrical tubes. In particular, in mass production small cost savings in the production are already of substantial significance.

According to the invention at least one of two longitudinal edges, intended for mutual placement on one another, of the subshells are provided with cutouts spaced apart in the longitudinal direction of the particular subshell. In the connected state of sections of this longitudinal edge, located between the cutouts with the corresponding longitudinal edge of the other subshell, a row of openings, spaced apart in the longitudinal direction of the corrugated tube, through the casing of the corrugated tube can thereby be formed. The axial compressibility or the buckling resistance of the corrugated tube in the region of the connected longitudinal edges can thereby be decreased. In the embodiment variant in which the corrugated tube is formed of at least two subshells formed of separate parts, such openings are consequently provided in each of the connection regions in which the longitudinal edges of two subshells are brought into placement on one another. Expressed differently, a particular connection seam between side edges in contact on one another of subshells between connection sites of the connection seam is punctuated by openings which in the axial direction of the corrugated tube are spaced apart from one another. In the embodiment variant in which the subshells are formed in a common sheet metal part, which, after the corrugations have been formed, is folded or curved, it is preferred that in the region between the subshells, thus in the region between the subshells of the folding or curving of the sheet metal part, the sheet metal part is provided with a row of openings spaced apart from one another in the longitudinal direction of the subshells. In the region of the bending ridge resulting through the folding or curving together of the sheet metal part, thereby the required force for an axial compression of the corrugated tube or a buckling-out of the corrugated tube can be reduced.

Overall a corrugated tube can be formed which is thus sufficiently deformable over the entire circumference in order to be utilized as an element, deformable in the event of a crash, of a steering column of a motor vehicle. When applied in the steering spindle, a sufficiently high torque can be transferred.

The openings punctuating the at least one connection seam between the subshells are advantageously located in the regions of the wave crests. In the case of a formation of the corrugated tube with a bending ridge, it is preferred that openings located in this ridge are disposed at the axial sites of the corrugated tube at which are located the wave crests.

BRIEF DESCRIPTION OF THE DRAWINGS

Further advantages and details of the invention will be explained in the following in conjunction with the attached drawings.

The drawings depict:

FIG. 1 to FIG. 3 illustrate different fabrication stages in the formation of a corrugated tube from a flat metal sheet according to a first embodiment of the invention, in oblique view, FIG. 4 and FIG. 5 illustrate cross sections in the region of a wave crest and wave trough through the formed sheet metal in the fabrication state according to FIG. 3, FIG. 6 is a schematic top view onto a deep-drawing tool in which the metal sheet to be formed is placed, in the closed state, FIG. 7 and FIG. 8 show sections along lines A-A and B-B of FIG. 6, FIG. 9 is a schematic oblique view of the tool in the opened state with the metal sheet disposed between the parts of the mold, FIG. 10 and FIG. 11 show cross sections through the sheet metal strip in the region of the wave crest and wave trough, in a further production phase, FIG. 12 and FIG. 13 show cross sections through the sheet metal strip in the region of the wave crest and wave trough in a further production phase, FIG. 14 is an oblique view of the sheet metal strip in the production phase according to FIGS. 12 and 13, FIG. 15 and FIG. 16 are oblique views of the finished corrugated tube rotated by 180° with respect to one another about the longitudinal axis of the corrugated tube, FIG. 17 to FIG. 21 illustrate fabrication stages in the formation of a corrugated tube formed from a flat metal sheet according to a second embodiment example of the invention, in oblique view, FIG. 22 and FIG. 23 show the finished corrugated tube according to this second embodiment example in oblique views, rotated with respect to each other by 180° about the longitudinal axis of the corrugated tube, FIG. 24 to FIG. 29 illustrate stages in the production of a corrugated tube from a flat sheet metal strip according to a third embodiment example of the invention, each in oblique view, FIG. 35 shows a stage in the production of a corrugated tube according to a fifth embodiment example of the invention, in oblique view, FIG. 36 is an oblique view of the finished corrugated tube according to this fifth embodiment example of the invention, FIG. 37 shows the corrugated tube (of FIG. 36) rotated by 180° about its longitudinal axis, FIG. 38 shows a stage in the production of a corrugated tube according to a sixth embodiment example of the invention, in oblique view, FIG. 39 shows the finished corrugated tube according to this sixth embodiment example of the invention, in oblique view, FIG. 40 shows the corrugated tube of FIG. 39 rotated by 180° about its longitudinal axis, FIG. 41 is a schematic representation of a tool for the production of a corrugated tube according to the third embodiment example of the invention, wherein parts of the tool frame have been removed for the sake of simplicity, in oblique view, FIG. 50 and FIG. 51 show sections along line E-E of FIG. 46, in the opened and closed state of the tool, FIG. 52 shows a portion of the bellows part of the tool, wherein the upper bellow plates and intermediate plates are shown in the manner of an exploded view, in the opened state, FIG. 53 shows a portion of the bellows part of the tool, wherein the lower bellow plates and intermediate plates are shown in the manner of an exploded view, in the opened state.

Figure 16:
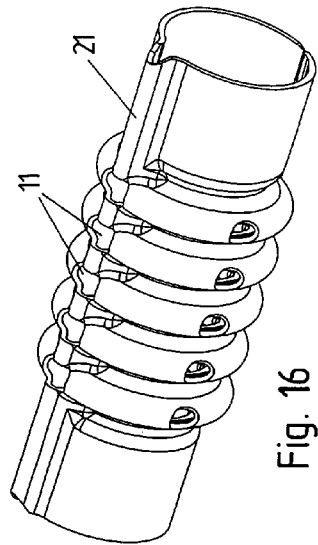
Figure 18:
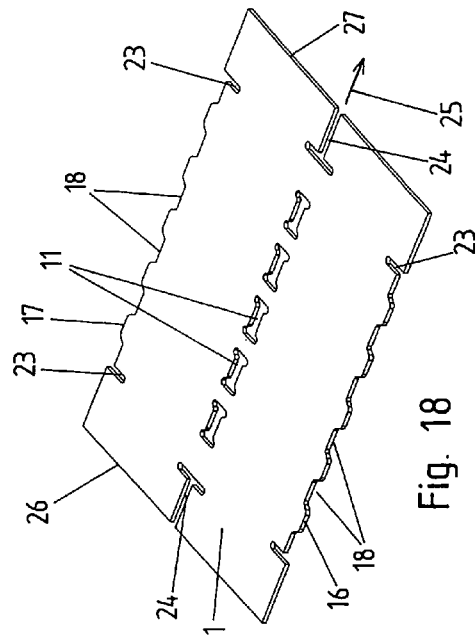

The drawings are shown at various scales.

DESCRIPTION OF THE PREFERRED EMBODIMENT EXAMPLES

A first embodiment example of the invention will be explained in the following in conjunction with FIGS. 1 to 16. The corrugated tube is formed of a flat, strip-form sheet metal part 1 (=metal blank) as the starting product. Into the flat sheet metal part 1 first through bending operations two flute-shaped depressions are placed. Each of these forms a subshell 2, 3, here a half shell, of the corrugated tube to be formed and are here disposed longitudinally next to each other in the sheet metal part 1; their longitudinal directions 25, in which they extend, or their longitudinal axes, are parallel to one another.

The two subshells 2, 3 are subsequently provided with corrugations 4, 5 extending transversely to the longitudinal axes of the subshells or longitudinal directions 25, i.e. the wave crests 6 and wave troughs 7 of the corrugations 4, 5 are located in planes which are oriented transversely, preferably at right angles, to the longitudinal axis or longitudinal direction 25 of the particular subshell 2, 3. In the depicted embodiment example the corrugations extend over a central section of the longitudinal extent of the subshells 2, 3.

Corrugations 4, 5 are introduced in this embodiment example of the invention through deep-drawing tools, wherein several deep-drawing steps are carried out, in each of which the amplitudes of the corrugations 4, 5 are increased (the number of deep-drawing steps depends also on the final amplitude of the corrugations to be reached). To this end the deep-drawing tools are applied with corrugations of increased amplitude correspondingly enlarged.

FIGS. 6 to 9 show schematically such a deep-drawing tool of one of the steps of the deep-drawing. The deep-drawing tool comprises a stationary lower mold part 8 and a movable upper mold part 9, wherein the lower mold part 8 includes flute-shaped depressions with corrugations oriented transversely hereto and the upper mold 9 elevations, in matching closure with the flute-shaped depressions of the lower mold part, with corrugations oriented transversely hereto, the corrugations of the lower and of the upper mold being formed such that they fit into one another in diametric opposition, cf. FIG. 7. When closing the deep-drawing tool with the preformed sheet metal part 1 placed inbetween, blank-holding bars 10 precede the upper mold 9, cf. FIG. 9, for securing the sheet metal part 1 in position. Through several deep-drawing tools of this type, which are provided with corrugations of different heights, the subshells can be corrugated such that they acquire continuously greater amplitudes.

Deep-drawing in several steps each with enlarged deformation is known per se.

FIG. 3 shows a stage in which the corrugations 4, 5 have only reached a portion of their amplitude finally to be reached (thus have the height measured between the wave crests 6 and the wave troughs 7. In this stage holes or openings 11, 12 are introduced into the preformed sheet metal part 1, preferably by punching them out. In the region in which punching is to be carried out the wave crests are still low in this stage. A row of openings 11, spaced apart from one another in the longitudinal direction of the subshells 2, 3, are introduced in the region between the two subshells 2, 3, thus when viewing the sheet metal part 1 from the concave side of the subshells 2, 3, in the region of the cupola between the two subshells 2, 3. Two further rows of openings 12 are introduced in the region of the longitudinal edges of the subshells 2, 3 and are again spaced apart from one another in the longitudinal direction of the subshells. These openings 12 extend into side portions 13, 14, yet to be removed, of the sheet metal part 1.

FIG. 4 and FIG. 5 depict cross sections through the production stage according to FIG. 3, wherein the sections extend through a wave crest (FIG. 4) or a wave trough (FIG. 5). Within the scope of this document wave crests and wave troughs of corrugations always refer to the view of the subshells 2, 3 from their convex sides or onto the outside of the finished corrugated tube.

Further rows of holes or openings 15 are preferably introduced in a region of a particular subshell 2, 3 which, with respect to the circumferential extent, is a central region, and specifically in the region of wave crests 6. These further openings 15 serve for facilitating the outflow of water (due to ice pressure risk) potentially penetrated into the finished corrugated tube during its use, for example in a motor vehicle.

In at least one further deep-drawing step the amplitude of the corrugations 4, 5 is again enlarged, as is shown in FIGS. 10 and 11. The widths of the flute-shaped depressions are also increased at the sites denoted in FIG. 10 by the arrow X, specifically in the particular regions of the wave crests, whereby the openings 11, 12 come to lie further into the region of the flutes.

In at least one further deep-drawing step the flute-shaped depressions (in the regions of the wave crests at the sites denoted by arrow X in FIG. 10) are once again enlarged in width as is evident in FIGS. 12 to 14, and possibly the amplitudes of the corrugations are again enlarged. The openings 11, 12 migrate herein further into the region of the flutes. The side portions 13, 14, furthermore, are removed, preferably through a punching operation. At the longitudinal sides removed from one another of the subshells 2, 3, longitudinal edges 16, 17 are hereby formed, which are provided with a row of cutouts 18, spaced apart from one another in the longitudinal direction of the subshells 2, 3, which cutouts are formed by portions of the previously available openings 12.

Through these deep-drawing steps such stresses occur, for example, that the sheet metal thickness, depending on the forming zone, is stretched (weakened) by 60-80% depending on the amplitude of the formed corrugations. Depending on the material utilized, annealing steps may possibly be required.

The preformed sheet metal part 1 is subsequently folded or curved in the region between the two subshells 2, 3 about an axis 19 parallel to the longitudinal direction of the subshells. This axis 19 is indicated in FIGS. 13 and 14 by a dot-dash line. When viewing the subshells 2, 3 from the concave side of the subshells 2, 3, this axis 19 is consequently in the region of the ridge between the two subshells 2, 3. Through this folding or curving the sections of the longitudinal edges 16, 17 between the cutouts 18 are brought into mutual contact and subsequently connected, preferably welded, with one another. The connection seam 20, formed here as a welding seam, is represented in FIG. 15 schematically by a thick line.

Figure 15:
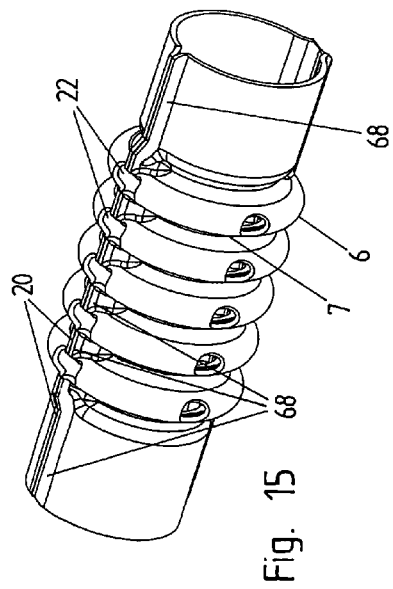
Figure 17:
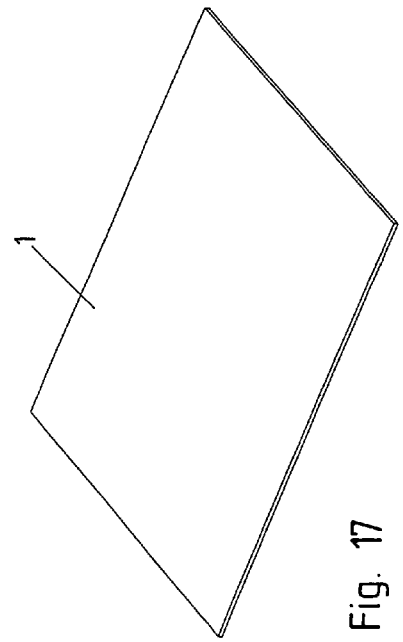

Therewith, a corrugated tube has overall been formed such as is depicted in FIGS. 15 and 16, which includes corrugations extending over a portion of its length. On opposite sides of its circumferential extent the corrugated tube has, on the one hand, a bending ridge 21, on the other hand, tabs 68, which are connected in the region of the longitudinal edges 16, 17 of the subshells 2, 3. Each of the subshells 2, 3, formed here in the form of half shells, extend over approximately 180° of the circumference of the corrugated tube. In the region of the bending ridge 21 is disposed a row of openings 11. In the region of the longitudinal edges 16, 17, connected with one another, is disposed a row of openings 22 spaced apart in the longitudinal direction, which openings are formed by the cutouts 18 of the two longitudinal edges 16, 17 and which punctuate the connection seam 20 extending between the two longitudinal ends of the corrugated tube and connecting the two subshell-form sections of the corrugated tube. The rows of openings 11 and 22 ensure ready axial compressibility of the corrugated tube in spite of the bending ridge 21 and the connected longitudinal edges 16, 17.

A further embodiment example of the invention will be described in the following in conjunction with FIGS. 17 to 23. As the starting product for the production of a corrugated tube again a flat (=level) sheet metal part 1 (=a flat metal blank) is employed. In this embodiment example in a flat sheet metal part 1, first, a row of openings 11 is formed, which openings are spaced apart from one another in a longitudinal direction 25. Further, longitudinal edges 16, 17 of the sheet metal part 1, which in this stage of fabrication still are oversized, are each provided with a row of cutouts 18. The individual cutouts 18 of the longitudinal edges 16, 17 are directly opposite one another (with reference to the longitudinal extent of the sheet metal part 1 located at the same sites of the longitudinal edges 16, 17).

At both ends of the section over which the corrugations are to be placed, the longitudinal edges 16, 17 are provided with slit-form cutouts 23. The transverse edges 26, 27 of the sheet metal part 1 are each provided in their center with a T-shaped cutout 24.

Again, flute-shaped depressions extending in the longitudinal direction 25 are subsequently introduced into the flat sheet metal part 1, which form subshells 2, 3, in the depicted embodiment example again two half shells of the corrugated tube to be produced, which are integrally connected with one another on their longitudinal edges. Introducing the flute-shaped depressions can again take place through appropriate bending operations. The preformed sheet metal part 1 in this stage of production of the corrugated tube is depicted in FIG. 19.

The two subshells 2, 3 are subsequently provided with corrugations 4, 5 extending transversely to their longitudinal direction. Initially, first corrugations 4, 5 are introduced which have only very low formings (amplitudes), as is shown in FIG. 20. These first corrugations 4, 5 can be developed, for example, through stamping or through deep-drawing, with a correspondingly low degree of deformation. The amplitudes of the first corrugations 4, 5 have, for example, less than ⅓ of their size to be attained at the end.

These first corrugations 4, 5 are subsequently unfolded under axial compression of the subshells 2, 3 until they have reached their desired heights. The preformed sheet metal part 1 in this production stage is shown in FIG. 21. This axial compression under unfolding of the corrugations (=increase of their amplitudes) will be referred to in the following as "bellowing" and will be explained later in further detail. Through such an axial unfolding of the corrugations the sheet metal is, for example, so stressed that a stretching in the range of 15 to 20% occurs. Therefore a lower starting sheet metal thickness than in the corrugated tube previously formed through deep-drawing steps is required and annealing processes can potentially be avoided.

The longitudinal edges 16, 17 in the region of the tabs 68 are precisely cut to size (FIG. 20). In the non-corrugated regions adjoining the longitudinal ends the longitudinal edges 16, 17 are precisely cut to size and curved such (cf. FIG. 21) that semicircular cross-section forms result.

The sheet metal part 1, thusly preformed, is again folded or curved about an axis 19 parallel to the longitudinal direction of the subshells 2, 3 and the sections of the longitudinal edges 16, 17 coming into contact with one another are connected, preferably welded, with one another whereby the corrugated tube depicted in FIGS. 22 and 23 is formed. In the region of the bending ridge 21, again, a row of openings 22 is located, which openings are spaced apart from one another in the longitudinal direction of the corrugated tube. In the region of the longitudinal edges 16, 17 connected with one another, also a row of openings 22 is disposed, which are spaced apart from one another in the longitudinal direction of the corrugated tube and which originate from the cutouts 18 of the two longitudinal edges 16, 17.

The rows of openings 11 and 22 ensure a ready axial compressibility or lateral knee-like buckling-away in the event of a crash, wherein, for example, when applied in a steering spindle of a motor vehicle, sufficiently high torques can be transferred.

Instead of being introduced into the still flat sheet metal part 1, openings 11 and/or cutouts 18 can also only be introduced in a later stage of the production, for example, after the formation of the flute-shaped depressions forming the subshells 2, 3.

Figure 30:
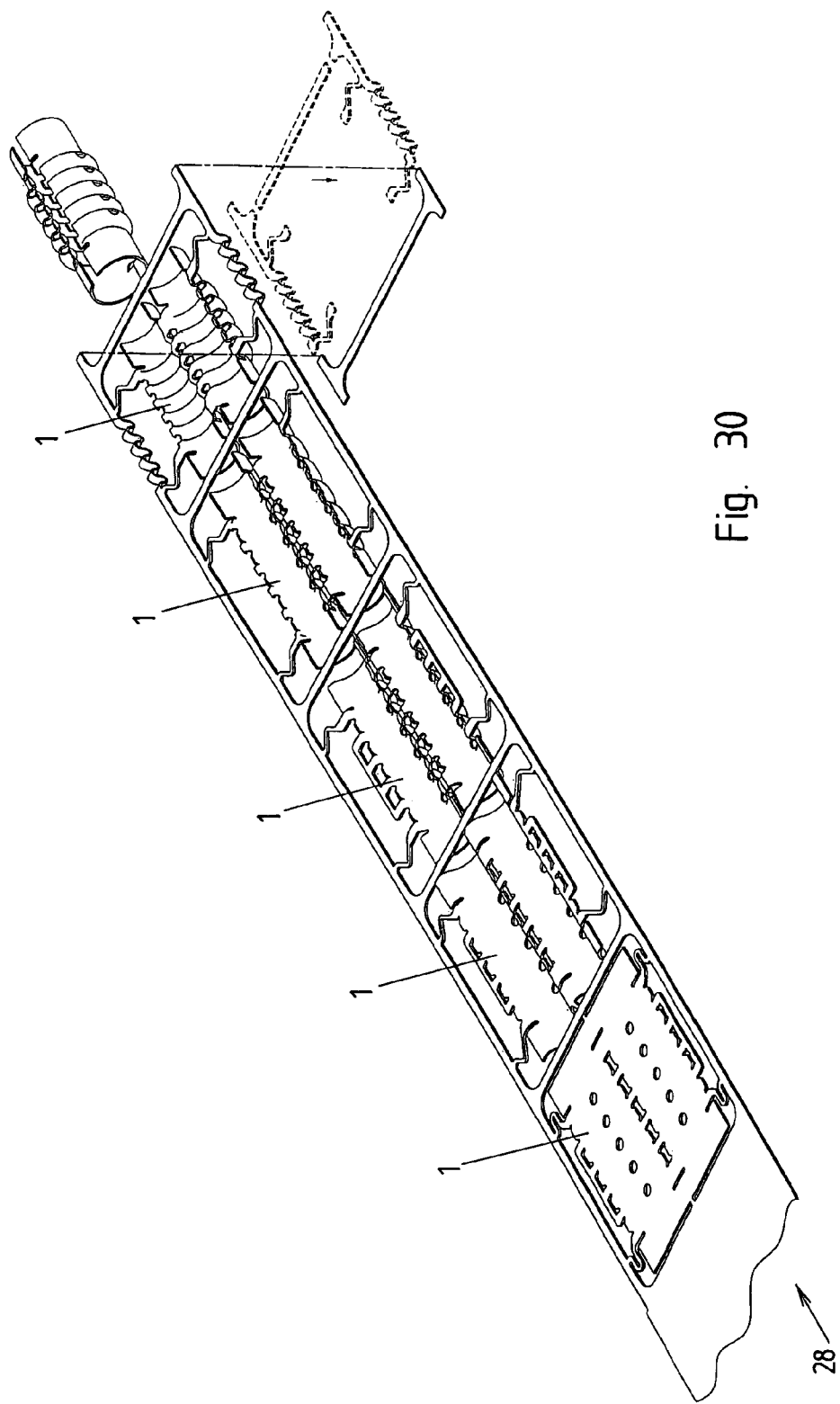
FIG. 30 is an overview representation of the sheet metal strip, which contains the sheet metal parts in the various fabrication stages.

A further embodiment example of the invention will be explained in the following in conjunction with FIGS. 24 to 29. This embodiment example corresponds in principle to the previously explained embodiment example, wherein here is carried out a continuous production of corrugated tubes in a sequential process from a band-form sheet metal strip. The contiguous sheet metal strip passes cyclically in time through several work stations, in each of which one fabrication step is completed (by means of a progressive die tool). In FIGS. 24 to 29 only one section of this sheet metal strip is shown in the discrete stages of the production of a corrugated tube. FIG. 30 shows as an overview the contiguous sheet metal strip with the parts in different stages of fabrication.

FIG. 24 shows a stage in which a punching operation has already been carried out, whereby a sheet metal part 1 has been punched out of the sheet metal strip 28, which part is connected via connection arms 29 extending in a curve and connection webs 30 with the remaining portion of the sheet metal strip 28.

FIG. 25 shows the state after the flute-shaped depressions extending in the longitudinal direction have been introduced for the formation of the subshells.

FIG. 26 shows the state after the first corrugations 4, 5 with low depth or amplitudes have been stamped in. The wave trough 7 can herein already have its final form.

Compared to FIG. 26, in the state according to FIG. 27 previously still existing holding parts 31 have been punched out such that the longitudinal edges 16, 17 have their finished dimension. Subsequently the bellowing takes place which will later be described in further detail. FIG. 28 shows the state after this bellowing.

The preformed sheet metal part 1 comprising the two subshells 2, 3 is subsequently folded or curved in order to bring the free longitudinal edges 16, 17 of the two subshells 2, 3 in contact. The connections arms 29 are herein also separated by a punching operation. FIG. 29 shows the state after the folding-together, wherein the two longitudinal edges 16, 17 are not yet brought entirely into contact. The removed clipped parts of the sheet metal strip are shown in dashed lines. The part 32, still shown in solid lines and separated from the corrugated tube to be formed, of the sheet metal strip serves as a stop and is only separated from the sheet metal strip after the next corrugated tube to be produced has been punched free. This part 32 forms subsequently again a clipped-off part.

The longitudinal edges 16, 17 brought into contact are subsequently connected, preferably welded, with one another. Herein over the region of the corrugation the outwardly projecting tabs in the region of the wave troughs are connected and furthermore the just formed sections of the longitudinal edges on both sides of the corrugations are connected, whereby tubular connections result which are circular in cross section. Overall a connection seam is formed which is punctuated through openings 22 disposed in the region of the wave crests.

The fourth embodiment example of the invention described in the following in conjunction with FIGS. 31 to 34 differs from the embodiment example of the invention previously described in conjunction with FIGS. 17 to 23, first, through the formation of the longitudinal edges 16, 17 of the sheet metal part 1. In the flat state of the sheet metal part 1, for example, the longitudinal edges 16, 17, which in this stage have excess dimensions, are here so punched that in the region, over which the corrugations are to be formed, further projecting tabs 33 and, in the region of the cutouts 18 disposed between these tabs 33, to a lesser-projecting extent, tabs 34 are located. At the sites referenced to the longitudinal extent of the corrugated tube to be formed, at which sites are located on a longitudinal edge 16 further projecting tabs 33, are located on the other longitudinal edge, to a lesser-projecting extent, tabs 34 and conversely.

Figure 32:
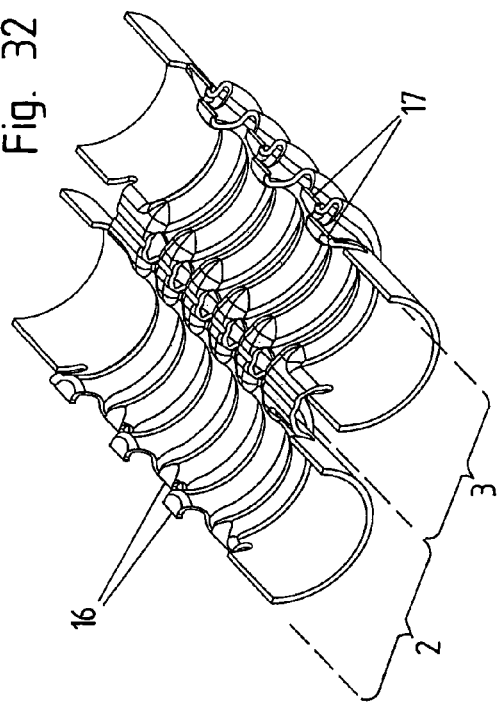
FIG. 31 and FIG. 32 show stages in the production of a corrugated tube according to a fourth embodiment example of the invention, in oblique view.
Figure 34:
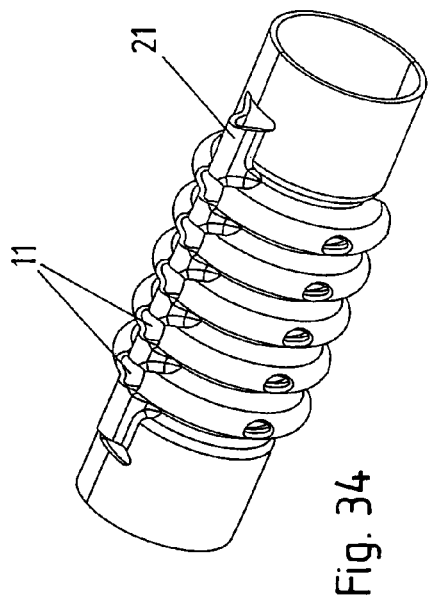
FIG. 34 shows the corrugated tube (of FIG. 33) rotated by 180° about its longitudinal axis.
Figure 31:
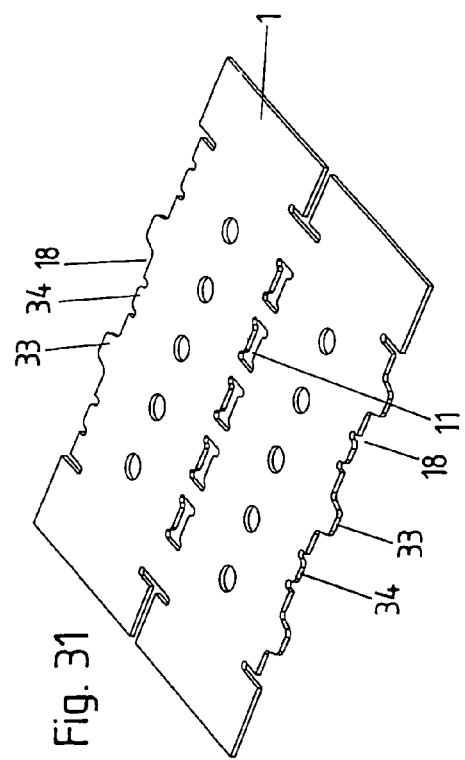
Figure 33:
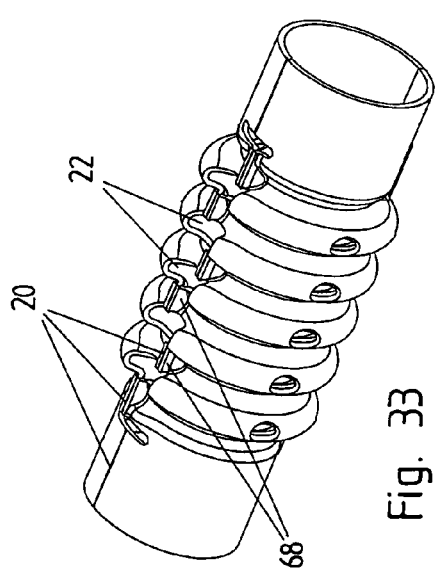
FIG. 33 is the finished corrugated tube according to this fourth embodiment example of the invention, in oblique view.
Figure 42:
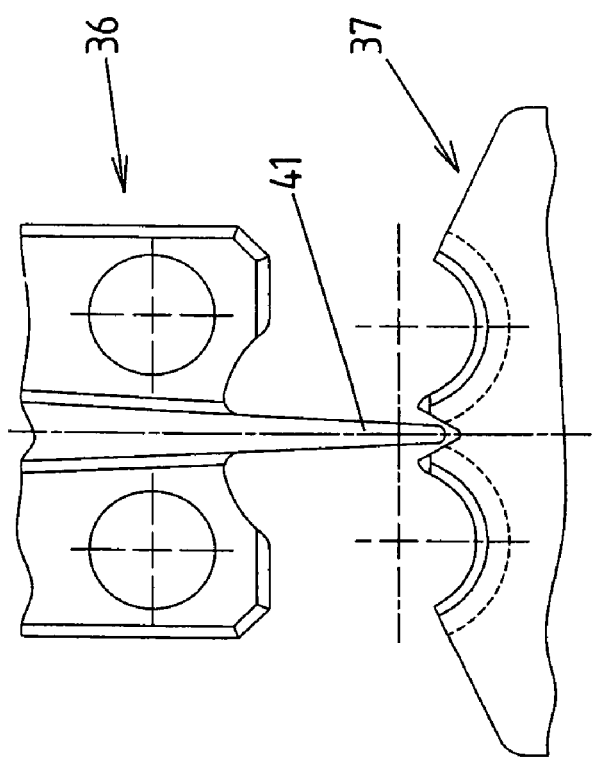
FIG. 42 and FIG. 43 are a schematic enlarged representations of the folding device of the tool of FIG. 41, in the closed and opened state.
Figure 43:
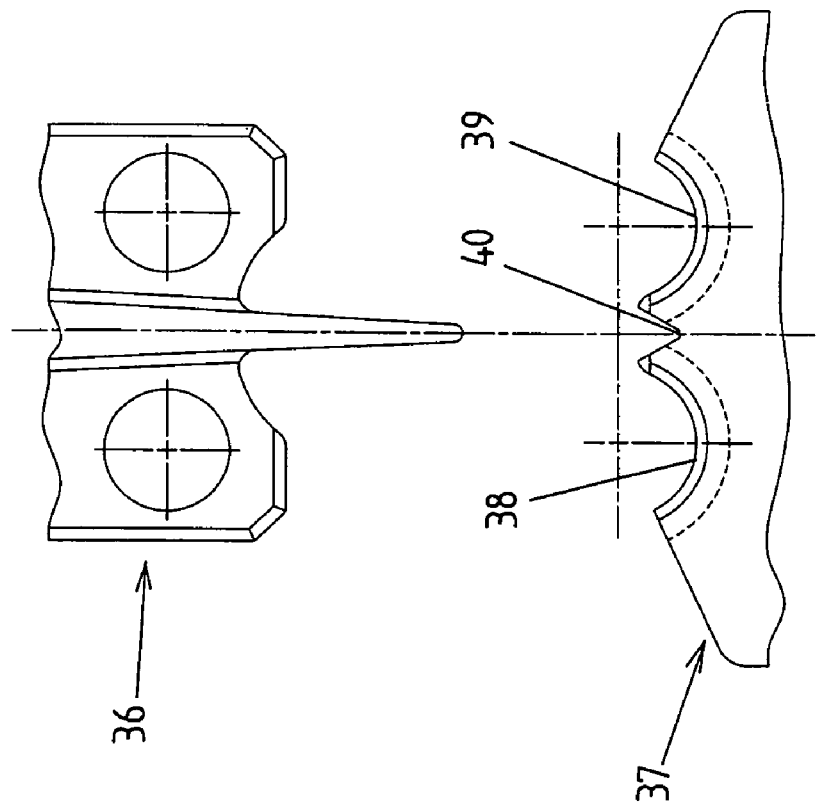
Figure 44:
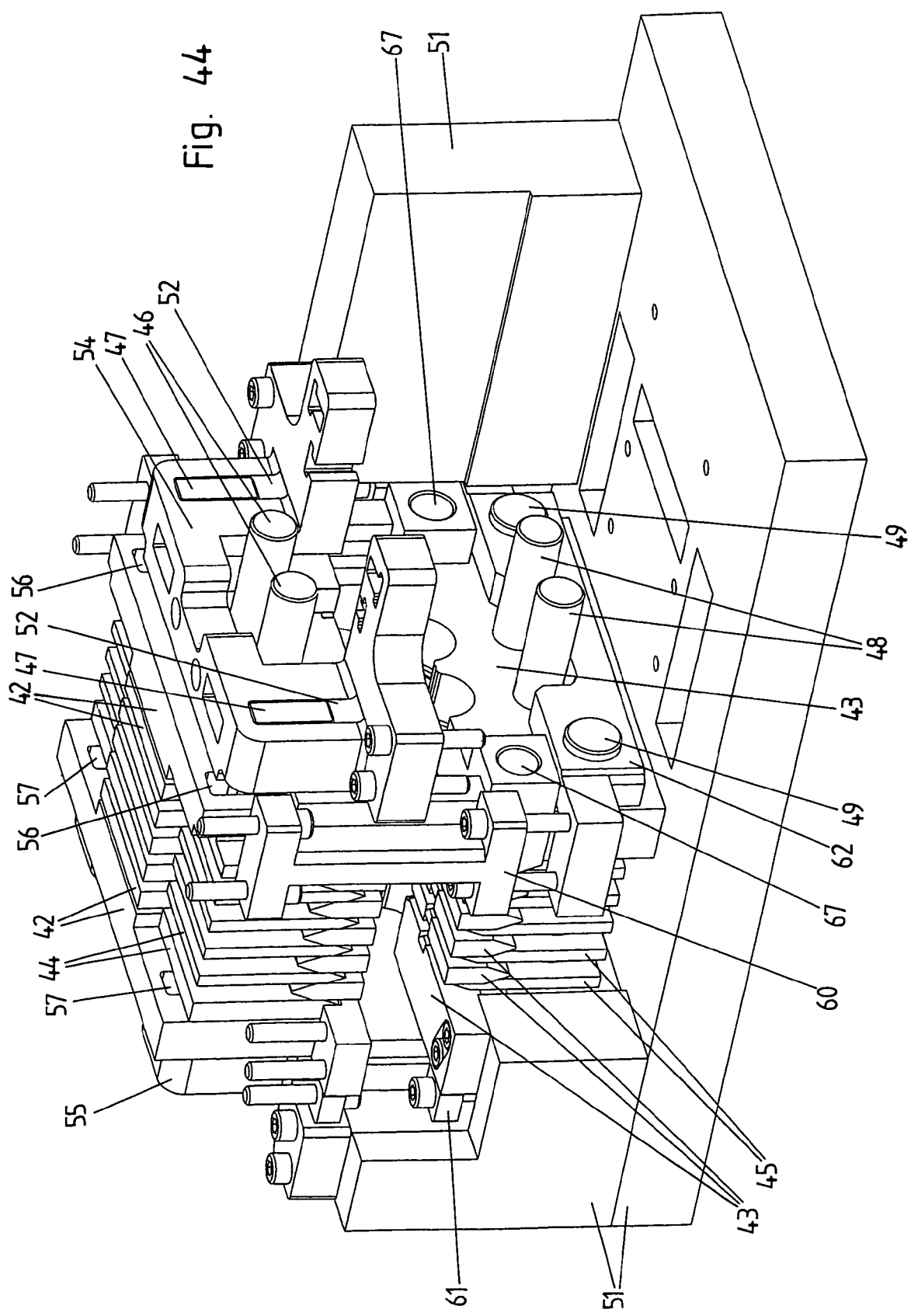
FIG. 44 shows the bellows part of the tool of FIG. 41, wherein parts of the pressing unit and the tool frame have been omitted for the sake of simplicity, in the opened state.
Figure 45:
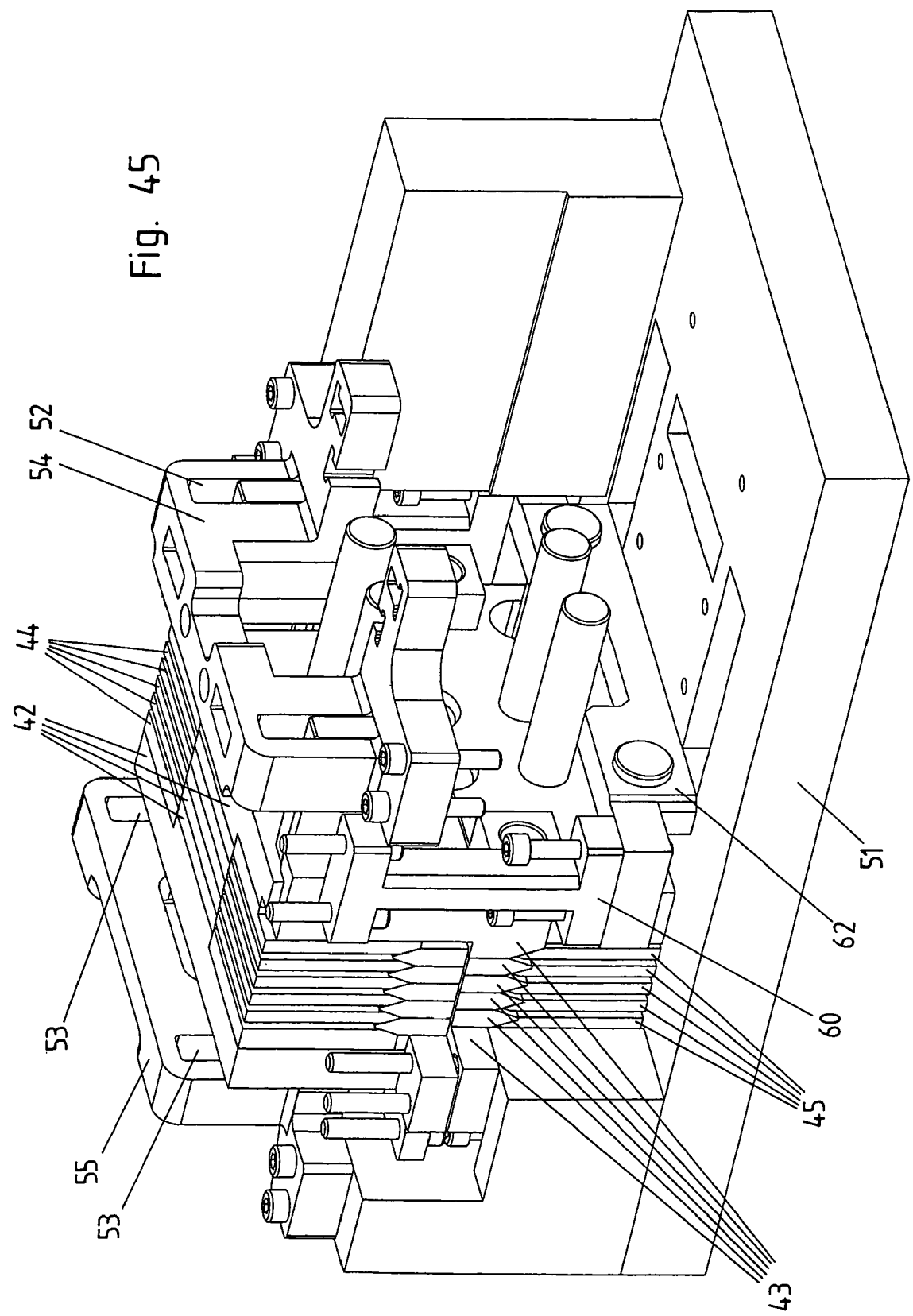
FIG. 45 shows the bellows part of the tool depicted in FIG. 44, however in the closed state of the tool.
Figure 46:
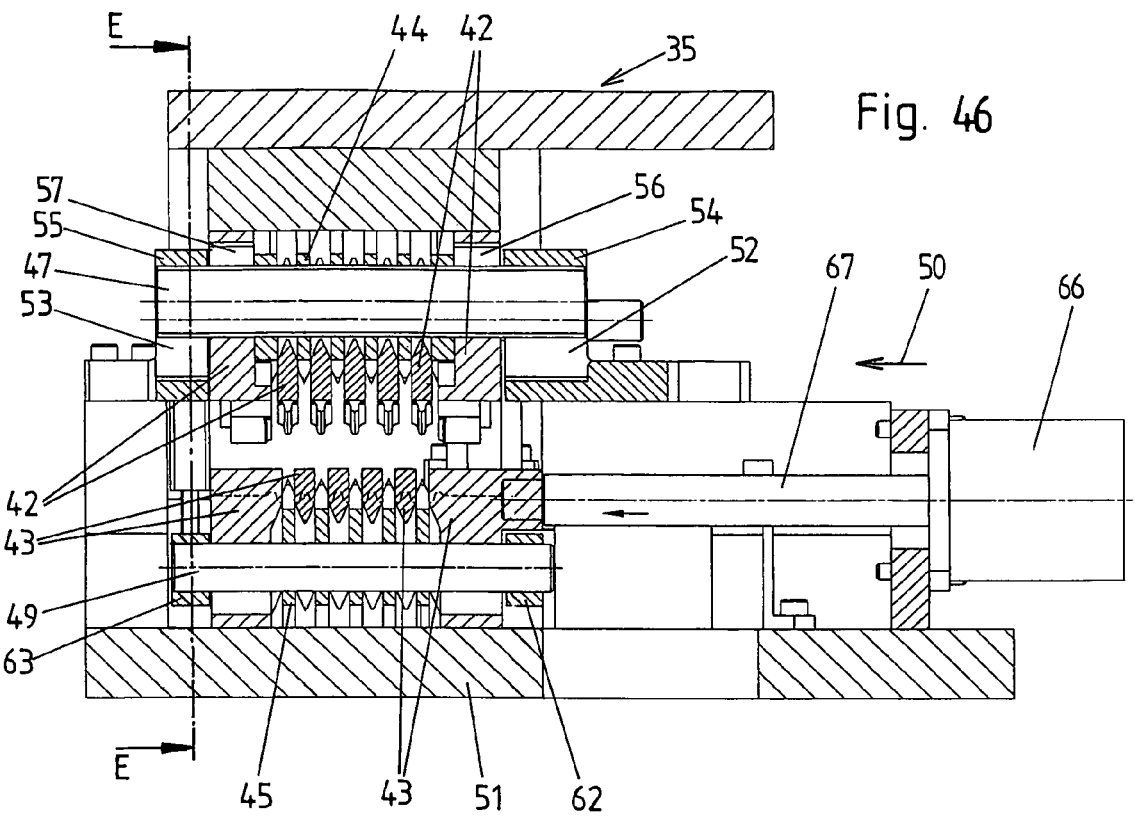
FIG. 46 and FIG. 47 show sections through the bellows part of the tool along line C-C of FIG. 50 in the opened and closed state.
Figure 47:
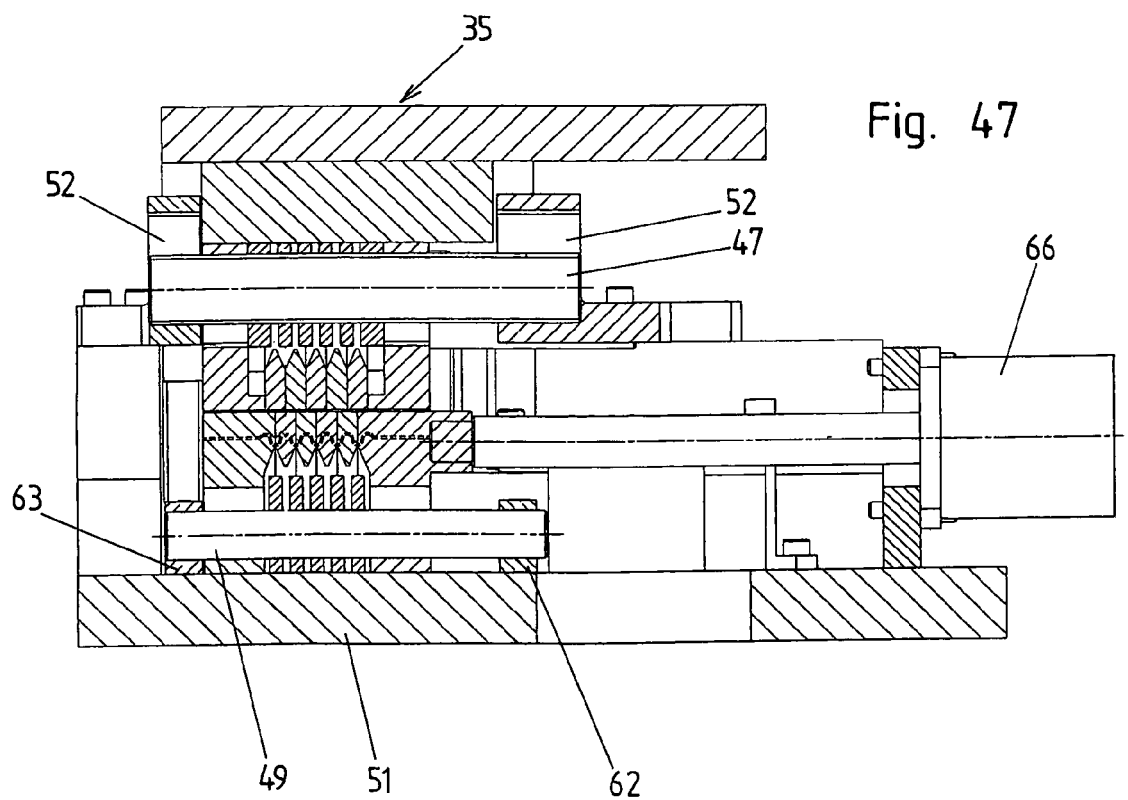
Figure 48:
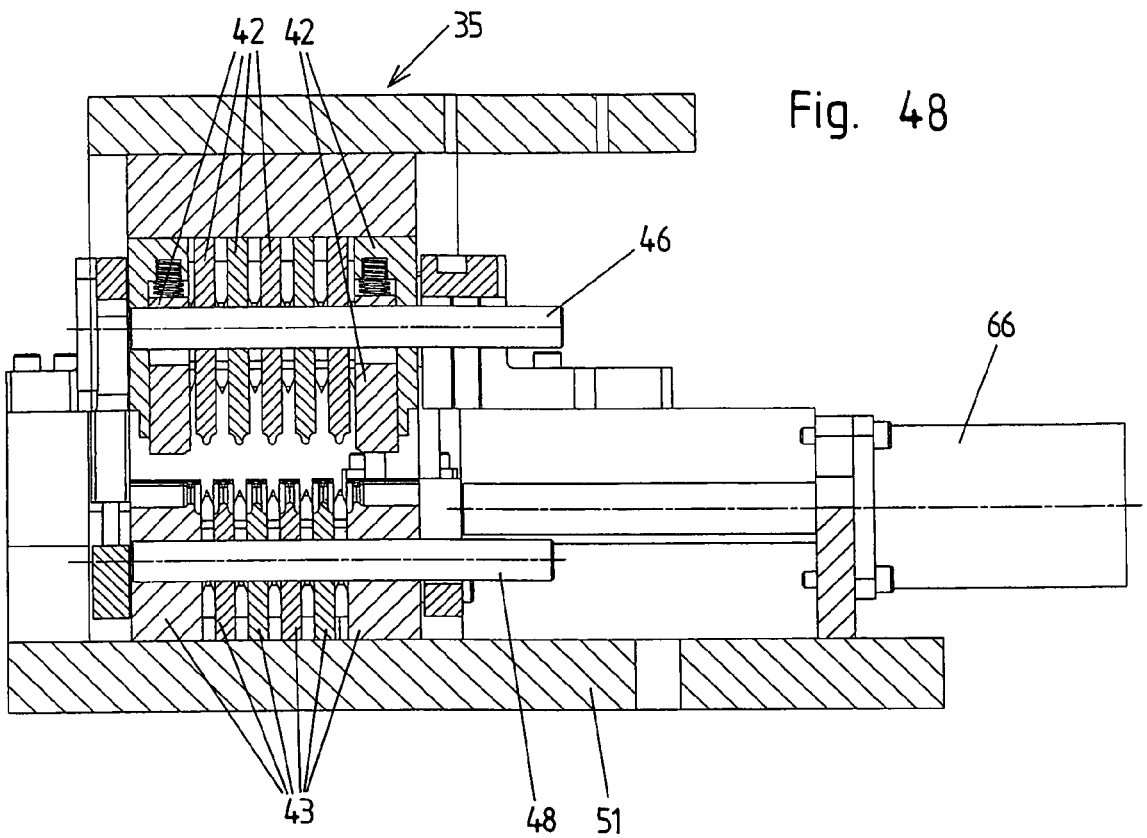
FIG. 48 and FIG. 49 show sections along line D-D of FIG. 50 in the opened and closed state of the tool.
Figure 49:
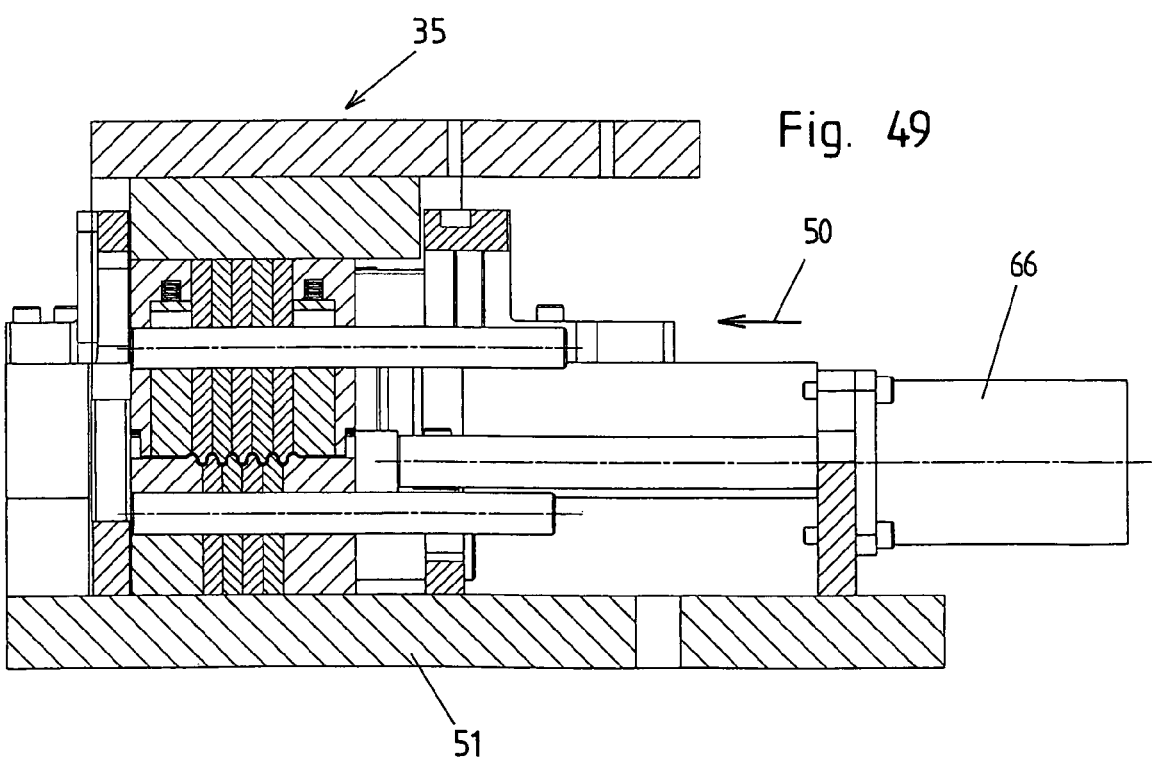

The method steps of introducing the flute-shaped depressions follow, then the stamping of corrugations of lesser formation, the precise cutting to size of the longitudinal edges 16, 17 and the bellowing under axial compression, whereby a preformed sheet metal part according to FIG. 32 is formed, which subsequently, as previously described, is folded together or curved, whereupon the longitudinal edges 16, 17 coming together in the region of tabs 33, 34 are connected with one another, preferably by welding. The connection sites of the longitudinal edges 16, 17 are herein offset against one another in zigzag form, wherein between the individual connection sites openings 22 are disposed. Through the connection seam 20 formed in the region of the corrugations in zigzag form and punctuated through the row of openings 22 a still lighter- or heavier-duty axial compressibility as well as a greater buckling angle of the corrugated tube is attained in the connection region of the longitudinal edges 16, 17.

In the embodiment example described in the following in conjunction of FIGS. 35 to 37, first, subshells 2, 3 separate from one another are formed. In this case sheet metal parts separate from the outset can be employed for the formation of these separate subshells or, initially, a common sheet metal part can be utilized as the starting product and the two subshells only be separated from one another in the course of their production.

The formation of a particular subshell 2, 3 can herein be carried out, for example, in an entirely analogous manner as has been explained in the preceding embodiment examples for two contiguous subshells. Instead of the folding together or curving of the two contiguous subshells, now the two completely formed subshells 2, 3 are placed together with their longitudinal edges 16, 17 such that the shape of the finished corrugated tube results. At the opposing longitudinal sides of the corrugated tube the longitudinal edges 16, 17 in contact on one another of the two subshells 2, 3 are subsequently connected with one another, in particular by being welded together. Between the discrete connection sites is here again located a row of openings 22, spaced apart from one another in the axial direction of the corrugated tube, which openings punctuate the particular connection seam 20. The connection sites can be located along a straight line extending in an axial direction or be offset in a zigzag pattern with respect to one another as is evident in FIGS. 36 and 37, wherein a connection seam 20 is formed extending in the region of the corrugations in a zigzag pattern and punctuated by openings 22. This connection seam 20 is specifically formed at opposing circumferential sites of the corrugated tube. The latter embodiment permits a greater buckling-out angle on both sides, for example, in the event of a crash.

In the previously described embodiment examples the flat metal sheet from which the corrugated tube is formed was formed as a single-layer metal sheet. Instead, two- or multilayer sheet metal could also be employed. An embodiment example for such a production method is evident in FIGS. 38 to 40. The two sheet metal layers are connected with one another in the flat state, for example in shear-free zones through appropriate welding spots or through penetration-joining methods from the material itself, such as TOX flat point procedures or clinching. The subshells 2, 3 can, again, be formed connected at one of their longitudinal edges or separate from one another. Such a separate formation is shown in FIGS. 38 to 40. For the remainder, the production corresponds to the described single-layer production. Through the use of multilayer sheet metal as the starting material, a multilayer corrugated tube can be produced. Such a tube has greater resiliency against deformation, for example, in the event of a crash, wherein, nevertheless, a high torque can be transferred.

The formation of the connection seams 20 by welding can advantageously be carried out by means of a wave-form welding beam guidance over the end side of the tabs 68, whereby these can be connected in one process step.

FIGS. 41 to 53 shows in simplified manner a feasible embodiment of a tool for bellowing and subsequent folding if the corrugated tube is formed in a sequential process from a sheet metal strip, as has previously been described in the third embodiment example in conjunction with FIGS. 24 to 29. FIG. 41 shows the tool in the opened state with the portion of the sheet metal strip located within the tool, which strip comprises two sections in which the two corrugated tubes to be produced are at different steps of fabrication.

After the bellowing described later, is effected the folding of the two subshells about an axis 19 (cf. for example FIG. 28) located between them parallel to the longitudinal direction of the subshells. Essential parts of the folding device are shown schematically in FIGS. 42 and 43 in perspective view. When the pressing unit 35 shown in FIG. 41 moves downwardly, it entrains the upper folding jaw, starting from its open position shown in FIG. 42, such that this folding jaw also moves downwardly in the direction of its active position shown in FIG. 43. The lower folding jaw 37 comprises two flute-shaped depressions 38, 39 disposed next to one another, which are provided with transverse corrugations and serve for the correct positional reception of the two subshells 2, 3. Between the two flute-shaped depressions 38, 39 is located a V-shaped depression 40, over which, in the emplaced state of the two subshells 2, 3, extends the section connecting the two subshells 2, 3. Into this V-shaped depression 40 a bending tongue 41 of the upper folding jaw 36 plunges during the lowering of the pressing unit 35, whereby the folding (=curving at small radius) of the preformed sheet metal strip is attained in order to bring into contact the initially remotely located longitudinal edges 16, 17 of the two subshells 2, 3, or at least to move them toward one another up to a relatively small distance as is shown in FIG. 29. Such a folding or curving with small radius is also referred to as edge bending.

During the downward movement of the pressing unit 35 the connection arms 29 are also separated by means of a punching tool.

FIGS. 44 to 53 depict only partially the bellowing part of the tool. This comprises upper and lower bellow plates 42, 43 as well as upper and lower intermediate plates 44, 45. In the opened state of the tool, the upper intermediate plates 44 are located between the upper bellow plates 42 and keep these spaced apart, and the lower intermediate plates 45 are located between the lower bellow plates 43 and keep these spaced apart. In the completely closed state of the tool, in contrast, the upper intermediate plates 44 are moved out of the intermediate spaces between the upper bellow plates 42, and the lower intermediate plates are moved out of the intermediate spaces between the lower bellow plates 43, such that the bellow plates 42, 43, compared to the open position of the tool, are axially moved together and preferably are directly in contact on one another, with a contact pressure being exerted.

In order to make such possible, the bellow plates 42, 43, apart from the rear-most bellow plates 42, 43, shown in FIGS. 46 to 49 at the far left, and the intermediate plates 44, 45 must be supported such that they are displaceable in the axial direction of the subshells 2, 3. The displaceable upper bellow plates 42 are supported on the upper bellow plate guide bars 46, the upper intermediate plates 44 on the upper intermediate plate guide bars 47, the displaceable lower bellow plates 43 on the lower bellow plate guide bars 48 and the lower intermediate plates 45 on the lower intermediate plate guide bars 49, such that they are displaceable in the axial direction of the particular guide bar.

The upper bellow plates 42 are height-displaceable with respect to the tool frame 51. This displacement takes place under the action of the pressing unit 35, wherein during the downward movement of the pressing unit 35 the bellow plates 42 and the bellow plate guide bar 46 are uniformly pressed downwardly. During a first phase of this displacement, the upper intermediate plates 44 follow uniformly the upper bellow plates 42. Herein the upper intermediate plate guide bars 47 are displaced downwardly in elongated holes 52, 53 of the front and rear yoke 54, 55 stationary on the tool frame until they reach the lower ends of these elongated holes 52, 53. In the further sequence of the displacement of the upper bellow plates 42 downwardly, no further displacement of the upper intermediate plates 44 can occur and the upper intermediate plate guide bar 47 moves in the elongated holes 56, 57 of the front and rear upper bellow plate 42. The upper intermediate plate guide bars 47 project upwardly through the elongated holes 56, 57. During this continued movement of the upper bellow plates 42 downwardly, furthermore, wedge-shaped sections 58 of the upper bellow plates 42 slide out on wedge-shaped sections 59 of the upper intermediate plates 44, whereby the upper bellow plates 42 can be continuously pressed together.

After the previously described first phase of the vertical displacement of the upper bellow plates 42 downward, furthermore, press-on pieces 60, 61 of the pressing unit 35 come into contact on transverse pieces 62, 63, on which are secured the lower intermediate plate guide bars 49. In the further sequence of the downward movement of the pressing unit 35 these lower transverse pieces 62, 63, and with them the lower intermediate plates 45, are displaced downwardly such that wedge-shaped sections 65 of the lower intermediate plates 45 slide out over wedge-shaped sections 64 of the lower bellow plates 43, and the lower bellow plates 43 can be pressed together synchronously with the upper bellow plates 42.

To press the upper and lower bellow plates 42, 43 together serve piston-cylinder units 66, whose piston rods 67 press together the bellow plates 42, 43, and specifically in the direction 50 in which the bellow plates 42, 43 are moved together, which direction is oriented parallel to the longitudinal direction of the subshells 2, 3 disposed in the bellows part of the tool. The piston rods 67 engage on the frontmost bellow plate 43, shown in FIG. 53 on the far right, and connected with it via a height guidance is the frontmost bellow plate 42, shown at the far right in FIG. 52, which is also via this guide acted upon by a pressing force through the piston rods 67.

In the open position the piston-cylinder units 66 are also acted upon by a low pressure which holds the intermediate plates 44, 45 in position ready to slide.

With the tool open, the preformed subshells 2, 3 are placed onto the lower bellow plates 43 wherein these lower bellow plates are engaged into a wave trough 7 of the corrugations 4, 5. The upper bellow plates 42 are moved downwardly by means of the pressing unit 35 until they engage into the wave crests 6 located between the wave troughs 7 (this corresponds to the previously described first phase). The upper and lower bellow plates 42, 43 are subsequently moved together in the axial direction of the subshells during which the corrugations unfold, enlarging the wave crests 6.

The advantage of this bellowing compared to a deep-drawing process is comprised in the lower degree of deformation of the sheet metal in the formation of the corrugations 4, 5. Annealing processes can thereby potentially also be avoided.

For the sheet metal serving as starting material can be utilized, for example, various steel qualities, stainless steels, aluminum alloys or brass. A surface protection of the sheet metal may be necessary depending on the installation site.

The connection seams 20 can be located radially within the outer surfaces of the wave crests 6, as well as the outer surface of the bending ridge 21. The formation of round connection stubs on both sides of the corrugated region is, as described, feasible.

Various modifications of the described embodiment example are conceivable and feasible without leaving the scope of the invention. It would, for example, be feasible to form two subshells with preformed corrugations of low amplitudes (for example by stamping methods) and, after the connection of the joined subshells, to unfold the corrugations through guided axial compressing of the preformed tube.

Conceivable and feasible would also be, for example, to form the flute-shaped depressions and the corrugations simultaneously, for example through deep-drawing methods.

Instead of a formation with two half shells, as is shown in the Figures, which each extend over 180° of the circumference of the corrugated tube, three one-third shells can also be formed, each extending over 120° of the circumference and curved about two axes 19, whereby a bending ridge 21 each is formed, and are connected along a connection seam. Three separate subshells can also be formed, which are connected via three connection seams. The formation with more than three subshells and corresponding connection seams and possible bending ridges is also conceivable and feasible.

In the finished state of the corrugated tube, the subshells extend each over a portion of the circumferential extent of the corrugated tube.

Conceivable and feasible in principle would also be to form at least two subshells in a common sheet metal part, which in the further process is curved about a parallel axis extending parallel to the longitudinal extent of the two subshells and to form in at least one further sheet metal part at least one further, initially separate, subshell, which subshell in the further course of the process is connected with the subshells formed in the other sheet metal part via connection seams.

As is evident based on the above description, the scope of the invention is not limited to the depicted embodiment examples, but rather should be determined with reference to the attached claims together with their full range of possible equivalents. While the preceding description and the drawing represent the invention, it is obvious to a person of skill in the art that various modifications can be carried out therein without leaving the true spirit and scope of the invention.

| Legend to the Reference Numbers: | |
|---|---|
| 1 | Sheet metal part |
| 2 | Subshell |
| 3 | Subshell |
| 4 | Corrugations |
| 5 | Corrugations |
| 6 | Wave crest |
| 7 | Wave trough |
| 8 | Lower mold part |
| 9 | Upper mold part |
| 10 | Blank-holding bar |
| 11 | Opening |
| 12 | Opening |
| 13 | Side portion |
| 14 | Side portion |
| 15 | Opening |
| 16 | Longitudinal edge |
| 17 | Longitudinal edge |
| 18 | Cutout |
| 19 | Axis |
| 20 | Connection seam |
| 21 | Bending ridge |
| 22 | Opening |
| 23 | Cutout |
| 24 | Cutout |
| 25 | Longitudinal direction |
| 26 | Transverse edge |
| 27 | Transverse edge |
| 28 | Sheet metal strips |
| 29 | Connection arm |
| 30 | Connection web |
| 31 | Holding part |
| 32 | Part |
| 33 | Tab |
| 34 | Tab |
| 35 | Pressing unit |
| 36 | Upper folding jaw |
| 37 | Lower folding jaw |
| 38 | Depression |
| 39 | Depression |
| 40 | Depression |
| 41 | Bending tongue |
| 42 | Upper bellow plate |
| 43 | Lower bellow plate |
| 44 | Upper intermediate plate |
| 45 | Lower intermediate plate |
| 46 | Upper bellow plate guide bar |
| 47 | Upper intermediate plate guide bar |
| 48 | Lower bellow plate guide bar |
| 49 | Lower intermediate plate guide bar |
| 50 | Direction |
| 51 | Tool frame |
| 52 | Elongated hole |
| 53 | Elongated hole |
| 54 | Front yoke |
| 55 | Rear yoke |
| 56 | Elongated hole |
| 57 | Elongated hole |
| 58 | Wedge-shaped section |
| 59 | Wedge-shaped section |
| 60 | Press-on piece |
| 61 | Press-on piece |
| 62 | Transverse piece |
| 63 | Transverse piece |
| 64 | Wedge-shaped section |
| 65 | Wedge-shaped section |
| 66 | Piston-cylinder unit |
| 67 | Piston rod |
| 68 | Tab |

The invention claimed is:

1. A method for the production of a deformable element of a steering spindle for a motor vehicle, which deformable element is formed as a corrugated tube provided with openings penetrating a wall of the corrugated tube, said method comprising:

forming from flat sheet metal at least two subshells extending in a longitudinal direction, the subshells having corrugations oriented transversely to their longitudinal direction, wherein the subshells are disposed longitudinally next to one another in a single common sheet metal part or are separate parts, wherein:

in the case of a formation of the at least two subshells disposed in the common sheet metal part next to one another, folding or curving a preformed sheet metal part in a region between the at least two subshells about an axis parallel to a longitudinal direction of the subshells, and bringing free longitudinal edges of the subshells into mutual contact so as to be connected with one another, and in the case of a formation of the at least two subshells in the form of separate parts, placing the separate subshells adjacent to each other with their longitudinal edges connected with one another, and wherein in the step of connection of the longitudinal edges, at least one of the two longitudinal edges of the subshells coming into mutual contact is provided with a row of cutouts spaced apart from one another in the longitudinal direction of the subshells, and through the connection of sections of the one of the longitudinal edges located between the cutouts with the other longitudinal edge, in a connection region of the two longitudinal edges, a number of openings spaced apart in the longitudinal direction of the corrugated tube are formed through the wall of the corrugated tube.

2. The method as claimed in claim 1, wherein, for the formation of the subshells having the corrugations oriented transversely to the longitudinal direction, flute-shaped depressions are formed into the common flat sheet metal part or into the separate parts, and the subshells formed by the flute-shaped depressions in the further course of the process in at least one separate process step are provided with corrugations oriented transversely to the longitudinal direction.

3. The method as claimed in claim 1, wherein for the connection of the longitudinal edges of the subshells brought into mutual contact, the longitudinal edges are welded together with one another.

4. The method as claimed in claim 1, wherein the longitudinal edges of the subshells coming into mutual contact are provided with tabs which, in the finished state of the corrugated tube, project outwardly and which, for the formation of a connection seam, are connected with one another.

5. The method as claimed in claim 4, wherein the tabs are only disposed in regions having wave troughs.

6. The method as claimed in claim 1, wherein the openings are located at axial sites of the corrugated tube at which wave crests are disposed.

7. The method as claimed in claim 1, wherein, in the case of a formation with at least two subshells disposed in the common sheet metal part, the sheet metal part is provided in the region between the at least two subshells or in the region between the at least two subshells to be formed with a row of openings spaced apart from one another in the longitudinal direction of the subshells, the openings in a finished state of the corrugated tube form a row of openings extending in the region of a bending ridge of the corrugated tube in the longitudinal direction of the corrugated tube.

8. The method as claimed in claim 7, wherein the openings are disposed at axial sites of the corrugated tube at which are located wave crests.

9. The method as claimed in claim 1, wherein flute-shaped depressions are formed into the common sheet metal part or into the separate parts, the flute-shaped depressions being formed by curving the common sheet metal part or one of the separate parts.

10. The method as claimed in claim 1, wherein the formation of the corrugations of the subshells comprises several deep-drawing steps, and in each of the deep-drawing steps the amplitude of the corrugations is increased.

11. The method as claimed claim 1, wherein the formation of the corrugations of the subshells comprises an axial compression of the subshells having preformed corrugations, in which the amplitudes of the preformed corrugations are increased, wherein the subshells are seized in wave troughs and wave crests by bellow plates, the bellow plates being axially pressed together under the unfolding of the corrugations.

12. The method as claimed in claim 1, wherein two half shells are formed as the subshells.

* * * * *